(12) United States Patent
Baldwin

(10) Patent No.: US 12,386,096 B2
(45) Date of Patent: Aug. 12, 2025

(54) ARTICLE SCANNING SYSTEM COMPRISING A BOOM APPARATUS

(71) Applicant: VAREX IMAGING CORPORATION, Salt Lake City, UT (US)

(72) Inventor: Francis Baldwin, Bordon (GB)

(73) Assignee: VAREX IMAGING CORPORATION, Salt Lake City, UT (US)

(*) Notice: Subject to any disclaimer, the term of this patent is extended or adjusted under 35 U.S.C. 154(b) by 6 days.

(21) Appl. No.: 18/040,343

(22) PCT Filed: Aug. 3, 2021

(86) PCT No.: PCT/GB2021/052000
§ 371 (c)(1),
(2) Date: Feb. 2, 2023

(87) PCT Pub. No.: WO2022/029419
PCT Pub. Date: Feb. 10, 2022

(65) Prior Publication Data
US 2024/0272324 A1 Aug. 15, 2024

(30) Foreign Application Priority Data
Aug. 5, 2020 (GB) .................................... 2012182

(51) Int. Cl.
*G01N 23/087* (2018.01)
*B60P 3/00* (2006.01)
(Continued)

(52) U.S. Cl.
CPC .................. *G01V 5/22* (2024.01); *B60P 3/00* (2013.01); *G01N 23/083* (2013.01);
(Continued)

(58) Field of Classification Search
CPC .... G01N 23/04; G01N 23/043; G01N 23/046; G01N 23/083; G01N 23/087;
(Continued)

(56) References Cited

U.S. PATENT DOCUMENTS 5,764,683 A * 6/1998 Swift ..................... G01N 23/04
378/197
6,563,903 B2 * 5/2003 Kang ....................... G01V 5/20
378/57
(Continued)

FOREIGN PATENT DOCUMENTS

| CN | 110927808 A | 3/2020 |
|---|---|---|
| EP | 2433152 B1 | 7/2021 |

OTHER PUBLICATIONS

International Search Report, International application No. PCT/GB2021/052000, Date of Mailing: Nov. 5, 2021.
(Continued)

*Primary Examiner* — Allen C. Ho
(74) *Attorney, Agent, or Firm* — Dorsey & Whitney LLP

(57) ABSTRACT

A boom apparatus for use in an article scanning system comprising: an primary upright section mountable on a vehicle; a lateral section comprising movably connected lateral portions; a secondary upright section comprising movably connected upright portions; and a radiation detector to detect radiation emitted by a radiation emitter; wherein each of the lateral section and the secondary upright section is movable between an extended arrangement and a collapsed arrangement, and the boom apparatus is configurable in: a deployed configuration where both the lateral section and the secondary upright section is in the extended arrangement, and the primary upright section, the lateral section and the secondary upright section define a structure through which an article to be scanned can pass, and a stowed configuration where each of the primary upright section, the
(Continued)

lateral section and the secondary upright section in the collapsed arrangement and further each is substantially upright.

20 Claims, 24 Drawing Sheets

(51) Int. Cl.
  *G01N 23/083* (2018.01)
  *G01N 23/10* (2018.01)
  *G01N 23/18* (2018.01)
  *G01V 5/22* (2024.01)

(52) U.S. Cl.
  CPC .......... *G01N 23/087* (2013.01); *G01N 23/10* (2013.01); *G01N 23/18* (2013.01); *G01V 5/232* (2024.01)

(58) Field of Classification Search
  CPC .......... G01N 23/10; G01N 23/18; G01V 5/20; G01V 5/22; G01V 5/222; G01V 5/223; G01V 5/224; G01V 5/226; G01V 5/232
  USPC .............................. 378/57, 58, 189, 196–198
  See application file for complete search history.

(56) References Cited

U.S. PATENT DOCUMENTS

| | | | | |
|---|---|---|---|---|
| 6,763,635 B1* | 7/2004 | Lowman | ............... | B66C 17/06 52/114 |
| 6,785,357 B2* | 8/2004 | Bernardi | ............... | G01V 5/20 378/57 |
| 6,843,599 B2* | 1/2005 | Le | ............... | G01V 5/20 378/102 |
| 6,920,197 B2* | 7/2005 | Kang | ............... | G01N 23/04 378/57 |
| 6,928,141 B2* | 8/2005 | Carver | ............... | G01N 23/04 378/197 |
| 6,937,692 B2* | 8/2005 | Johnson | ............... | G01V 5/22 378/57 |
| 7,215,737 B2* | 5/2007 | Li | ............... | G01V 5/22 378/57 |
| 7,322,745 B2* | 1/2008 | Agrawal | ............... | G01N 23/04 378/102 |
| 7,352,843 B2* | 4/2008 | Hu | ............... | G01V 5/20 378/57 |
| 7,369,643 B2* | 5/2008 | Kotowski | ............... | G01V 5/20 378/197 |
| 7,379,530 B2* | 5/2008 | Hoff | ............... | G01V 5/22 378/57 |
| 7,460,639 B2* | 12/2008 | Tudor | ............... | G01V 5/22 250/359.1 |
| 7,483,510 B2* | 1/2009 | Carver | ............... | G01V 5/22 378/197 |
| 7,486,768 B2* | 2/2009 | Allman | ............... | G01V 5/232 378/57 |
| 7,497,618 B2* | 3/2009 | Chen | ............... | G01V 5/22 378/57 |
| 7,526,064 B2* | 4/2009 | Akery | ............... | G01T 1/24 378/57 |
| 7,660,386 B2* | 2/2010 | Meng | ............... | G01V 5/20 378/197 |
| 7,663,109 B2* | 2/2010 | Kang | ............... | G01V 5/22 250/359.1 |
| 7,702,070 B2* | 4/2010 | Kang | ............... | G01V 5/226 378/57 |
| 7,783,004 B2* | 8/2010 | Kotowski | ............... | H05G 1/02 378/57 |
| 7,819,580 B2* | 10/2010 | Song | ............... | G01V 5/22 378/57 |
| 7,876,880 B2 | 1/2011 | Kotowski et al. | | |
| 7,963,695 B2* | 6/2011 | Kotowski | ............... | G01N 23/04 378/57 |
| 7,984,940 B2* | 7/2011 | Chen | ............... | E05D 5/02 378/57 |
| 8,275,091 B2* | 9/2012 | Morton | ............... | H05G 1/02 378/57 |
| 8,345,819 B2* | 1/2013 | Mastronardi | ............... | G01V 5/20 378/57 |
| 8,439,565 B2* | 5/2013 | Mastronardi | ............... | G01V 5/22 378/57 |
| 8,615,067 B2* | 12/2013 | Hayes | ............... | G01V 5/20 378/57 |
| 8,731,137 B2* | 5/2014 | Arroyo, Jr. | ............... | G01V 3/165 378/57 |
| 8,824,632 B2* | 9/2014 | Mastronardi | ............... | G01V 5/223 378/57 |
| 8,971,487 B2* | 3/2015 | Mastronardi | ............... | G01V 5/20 378/57 |
| 9,057,679 B2* | 6/2015 | Morton | ............... | G01N 23/20083 |
| 9,218,933 B2* | 12/2015 | Langeveld | ............... | G01V 5/22 |
| 9,223,049 B2 | 12/2015 | Kotowski et al. | | |
| 9,625,607 B2* | 4/2017 | Tudor | ............... | G01V 5/22 |
| 10,429,001 B2* | 10/2019 | Miles | ............... | F16M 11/18 |
| 10,591,629 B2* | 3/2020 | Toppan | ............... | G01N 23/083 |
| 10,761,236 B2* | 9/2020 | Qu | ............... | G01V 5/00 |
| 10,962,677 B2* | 3/2021 | Jegou | ............... | G01N 23/10 |
| 2011/0038453 A1 | 2/2011 | Morton et al. | | |
| 2015/0325401 A1 | 11/2015 | Langeveld et al. | | |
| 2019/0250302 A1 | 8/2019 | Qu et al. | | |

OTHER PUBLICATIONS

UK Intellectual Property Office, Application No. GB2012182.8, Date of Search: Dec. 3, 2020.
UK Intellectual Property Office, Application No. GB2111166.1, Date of Search: Dec. 9, 2021.

* cited by examiner

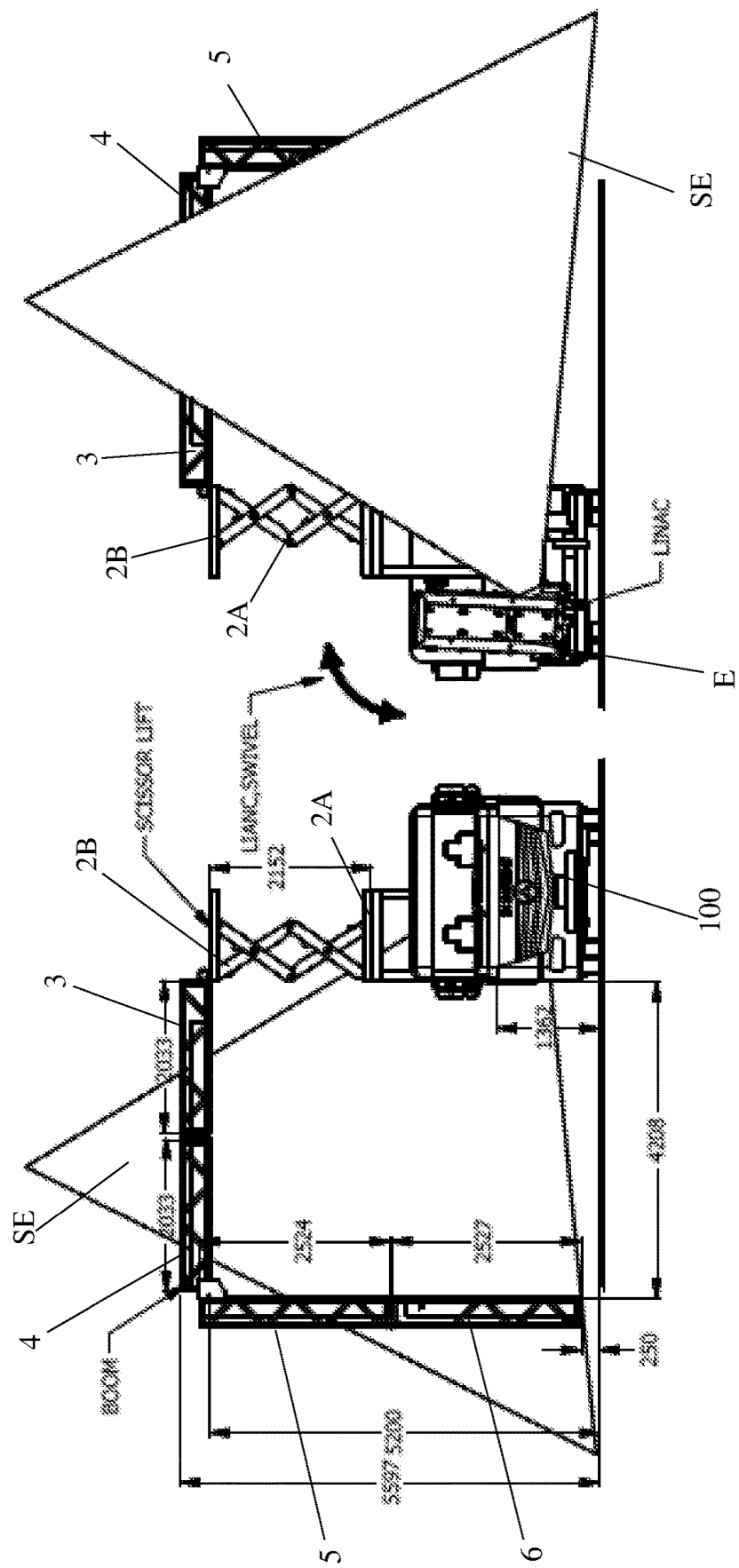

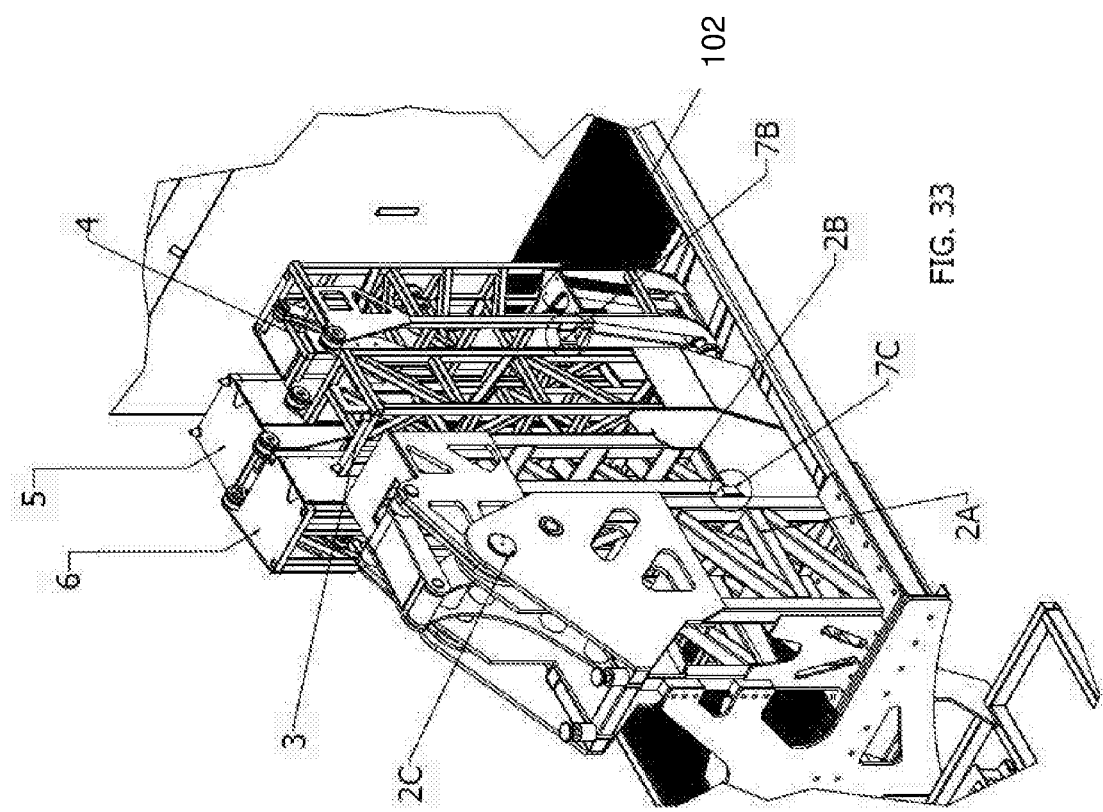

ARTICLE SCANNING SYSTEM COMPRISING A BOOM APPARATUS

TECHNICAL FIELD OF THE INVENTION

The present invention relates to a boom apparatus for use in an article scanning system, to an article scanning system comprising the boom apparatus, and to methods relating thereto.

BACKGROUND TO THE INVENTION

In areas of heightened security such as war zones and border crossings, article scanning systems are deployed for the detection of non-permitted or illegal items, such as contraband and weaponry, which may otherwise be concealed within an article, typically a vehicle.

An article scanning system may include a vehicle, e.g. a trailer (as a part of the system); a radiation emitter unit; a radiation detector unit; and a boom apparatus which is movable between a deployed configuration and a stowed configuration. In the deployed configuration the arrangement of the boom apparatus, the emitter unit and the detector unit is such that the article scanning system can be used to scan an article, typically a target vehicle, for illicit items. In the stowed configuration the boom apparatus is arranged to facilitate transportation of the article scanning system, typically by road, from one location to another, using the vehicle of the system.

To meet regulations and facilitate working operation, various requirements must be factored into the design of an article scanning system. For example, in certain territories, the height of the article scanning system must be under a set limit (which may vary from one territory to another) to comply with road safety regulations. Also, the boom apparatus must be of a sufficient height in a deployed configuration such that articles to be scanned can pass under and through the boom apparatus, otherwise the system would be unable to scan such articles. These requirements are at conflict with each other and a balance needs to be struck.

Thus, in certain article scanning systems, the boom apparatus is stowed along the length of a loading platform of the vehicle, thereby allowing the system to meet height requirements for road-use. However, this means a vehicle having a long loading platform is required and most or all of the space on the loading platform is taken up by the boom apparatus. As a result, such article scanning systems utilise space inefficiently.

Moreover, in known article scanning systems, the radiation detector module and the radiation emitter module are arranged such that the scanning envelope (i.e. the effective volume scanned by the system) is fixed in position. This can be problematic when the articles to be scanned vary in size because the scanning envelope may not optimally overlap with the article.

The present invention seeks to overcome or ameliorate one or more of the above-mentioned or other problems.

SUMMARY OF THE INVENTION

According to a first aspect of the present invention there is provided a boom apparatus for use in an article scanning system, the boom apparatus comprising: a primary upright section mountable on a vehicle of the system; a lateral section comprising two or more movably connected lateral portions; a secondary upright section comprising two or more movably connected upright portions; and a radiation detector module arranged to detect radiation emitted by a radiation emitter module; wherein each of the lateral section and the secondary upright section is movable between an extended arrangement and a collapsed arrangement, and wherein the boom apparatus is configurable between: a deployed configuration in which each of the lateral section and the secondary upright section is in the extended arrangement, and the primary upright section, the lateral section and the secondary upright section define a structure through which an article to be scanned can pass, and a stowed configuration in which each of the lateral section and the secondary upright section is in the collapsed arrangement.

In embodiments, by virtue of the collapsible nature of the boom apparatus, the boom apparatus can be efficiently stowed on a vehicle whilst complying with height requirements set by road safety regulations. In particular, the boom apparatus can efficiently utilise space on the vehicle, rather than being provided along most of or the entire length of the vehicle or loading platform thereof. Indeed, in embodiments, the length of the boom apparatus in the stowed configuration may be less than the width of the vehicle on which it is mounted. As such, the boom apparatus can extend across, rather than along the vehicle on which it is mounted, allowing use of a shorter vehicle or providing greater loading space for other items.

The primary upright section may be height-adjustable. In this way, the primary upright section may be a lift. The primary upright section may be movable between an extended arrangement and a collapsed arrangement. There may be a plurality of extended arrangements, with each extended arrangement being provided at a different height from another extended arrangement.

In embodiments, the primary upright section may be telescopically height-adjustable.

In embodiments, the primary upright section may comprise a scissor lift or a concertina lift.

The boom apparatus (e.g. the primary upright portion) may comprise a cage.

The cage may be mountable on the vehicle. The scissor lift or the concertina lift may be mounted on the cage. The lateral portions and the upright portions can advantageously be stowed in and thereby protected by the cage.

Using a height-adjustable primary upright section enables the height of the boom apparatus when arranged in the deployed configuration to be varied. Thus, the boom apparatus can be optimised for scanning articles of different heights (e.g. cars and trucks).

The primary upright section may comprise a hollow, e.g. lattice, structure. The lattice structure may comprise a plurality of beams connected at nodes to define an internal lattice area.

The lateral section may comprise two, three, four or more lateral portions. In a preferred embodiment, the lateral section comprises two lateral portions. The lateral section may comprise a first lateral portion and a second lateral portion.

The lateral section may comprise a hollow, e.g. lattice, structure. One, more or each of the lateral portions may comprise a lattice structure. The lattice structure may comprise a plurality of beams connected at nodes to define an internal lattice area. Having a lattice structure helps reduces the weight of the boom apparatus. Thus, having a lattice arrangement can enable the boom apparatus to more easily and efficiently be moved between the deployed configuration and the stowed configuration. The lateral portions may be connected in an in series, end-to-end arrangement.

The secondary upright section may comprise two, three, four or more upright portions. In a preferred embodiment, the secondary upright section comprises two upright portions. The secondary upright section may comprise a first upright portion and a second upright portion. The upright portions of the secondary upright section may be connected in an in series, end-to-end arrangement.

An end of the primary upright section and an end of the lateral section may be movably, e.g. slidably and/or pivotally, connected. The other end of the lateral section and an end of the secondary upright section may be movably, e.g. slidably and/or pivotally, connected. The other end of the secondary upright section may be free.

An end of the primary upright section (e.g. the end distal the vehicle of the system) and an end of the first lateral portion may be movably (e.g. slidably and/or pivotally) connected. The connection is preferably direct (i.e. without any further lateral portions connected between the first upright section and the first lateral portion).

The first lateral portion and the second lateral portion may be movably (e.g. slidably and/or pivotally) connected. The other end of the first lateral portion and an end of the second lateral portion may be movably (e.g. slidably and/or pivotally) connected. The connection between the first lateral portion and the second lateral portion may be direct (i.e. without any further lateral portions connected between the first lateral portion and the second lateral portion) or indirect (i.e. with further lateral portions connected between the first lateral portion and the second lateral portion). Preferably the connection is direct.

The other end of the second lateral portion and an end of the first upright portion may be movably (e.g. slidably and/or pivotally) connected. The connection is preferably direct (i.e. without any further lateral or upright portions connected between the second lateral portion and the first upright portion).

The first upright portion and the second upright portion may be movably connected. The other end of the first upright portion and an end of the second upright portion may be movably (e.g. slidably and/or pivotally) connected. The connection between the first upright portion and the second upright portion may be direct (i.e. without any further upright portions connected between the first upright portion and the second upright portion) or indirect (i.e. with further upright portions connected between the primary upright portion and the second upright portion). Preferably the connection is direct.

The other end of the second upright portion may be free (i.e. not connected to anything else).

The secondary upright section may comprise a hollow, e.g. lattice, structure. The lattice structure may comprise a plurality of beams connected at nodes to define an internal lattice area.

In embodiments, the primary upright section may comprise two, three, four or more upright lift parts. In a preferred embodiment, the primary upright section comprises two upright lift parts, a first lift part and a second lift part. The first lift part and second lift part may be connected in series in an end-to-end arrangement. In such embodiments, a first end of the first lift part may be fastened to the vehicle. The first lift part and the second lift part may be movably (e.g. slidably and/or pivotally) connected. A second (other) end of the first lift part and a first end of the second lift part may be movably (e.g. slidably and/or pivotally) connected. The connection between the first lift part and the second lift part may be direct (i.e. without any further portions connected between the first lift part and the second lift part) or indirect (i.e. with further portions connected between the first lift part and the second lift part). The connection between the first lift part and the second lift part may be provided by a connector. The connector may comprise a hinge.

The second lift part may be configured to pivot with respect to the first lift part. The angle between the first lift part and the second lift part may be changeable between 0 and 180 degrees. In an extended arrangement, the first lift part and second lift part may be arranged axially with an angle between the first lift part and second lift part of around 180 degrees.

In an extended arrangement, the connector may be configured to stack the second lift part (directly) on top of the first lift part. In the extended arrangement the connector may be configured to connect the first lift part and second lift part in a plug and socket arrangement. The plug and socket arrangement may be a ball and socket arrangement. This minimises the weight that must be supported through the connector reducing the likelihood of structural failure, especially where the connector is a hinge as the hinge joint is not required to support the weight of the boom apparatus. This also provides additional rigidity to the boom assembly when in the deployed configuration.

The first lift part (or second lift part) and connector may have a combined length substantially equal to the length of the second lift part (or first upright light part). Thus, the second lift part (or first lift part) may be rotated about the connector and stack in an upright position next to the first lift part/connector (or second upright light part/connector) with an equal height (length) making more efficient use of space in the stowed configuration.

Each of the lateral portions and upright portions may have a length substantially equal to the length of the second lift part. Thus, the lateral portions, upright portions and upright lift parts all have an equal height (length) in the stowed configuration making more efficient use of space in the stowed configuration.

In a collapsed arrangement, the first lift part and second lift part of the primary upright section may be arranged side by side with their longitudinal axes parallel. In the collapsed arrangement an angle between the first lift part and second lift part may be around 0 degrees.

An end of the primary upright section (e.g. a second end of the second lift part) and an end of the first lateral portion may be movably (e.g. slidably and/or pivotally) connected. The connection is preferably direct (i.e. without any further lateral portions connected between the primary upright section and the first lateral portion).

There may be a plurality of deployed configurations wherein in each deployed configuration the boom apparatus has a respective size. Thus, one size may differ from another size in height and/or width.

In embodiments, in the deployed configuration the primary upright section may be in the extended arrangement. In some embodiments, in the deployed configuration the primary upright section may be in the extended arrangement. In some embodiments, in the stowed configuration, the primary upright section may be in the collapsed arrangement.

In the deployed configuration, the structure defined by the primary upright section, the lateral section and the secondary upright section may be substantially U-shaped (e.g. substantially inverted-U-shaped).

In the deployed configuration, the structure of the primary upright section, the lateral section and the secondary upright section may define a plane. This may be referred to herein as the plane of the boom apparatus in the deployed configuration.

In the deployed configuration, the angle between adjacent lateral portions may be around 180 degrees. In the stowed configuration, the angle between adjacent lateral portions may be around zero degrees.

In the deployed configuration, the angle between adjacent upright portions may be around 180 degrees. In the stowed configuration, the angle between adjacent upright portions may be around zero degrees.

In the deployed configuration, the angle between adjacent upright lift parts of the primary upright section may be around 180 degrees. In the stowed configuration, the angle between adjacent upright lift parts of the primary upright section may be around zero degrees.

In the deployed configuration, the angle between the primary upright section and the lateral section may be around 90 degrees. In the deployed configuration, the angle between the primary upright section (second lift part) and the first lateral portion may be around 90 degrees.

In the stowed configuration, the angle between the primary upright section and the lateral section may be around zero degrees. In the stowed configuration, the angle between the primary upright section (second lift part) and the first lateral portion may be around zero degrees.

In the deployed configuration, the angle between the lateral section and the secondary upright section may be around 90 degrees. In the deployed configuration, the angle between the second lateral portion and the first upright portion may be around 90 degrees.

In the stowed configuration, the angle between the lateral section and the secondary upright section may be around zero degrees. In the stowed configuration, the angle between the second lateral portion and the first upright portion may be around zero degrees.

In the deployed configuration, the upright lift parts of the primary upright section may be arranged in a substantially linear formation (i.e. axially).

In the deployed configuration, the upright portions may be arranged in a substantially linear formation (i.e. axially).

In the deployed configuration, the lateral portions may be arranged in a substantially linear formation (i.e. axially).

In the stowed configuration, adjacent upright lift parts of the primary upright section may be arranged in a substantially side-by-side formation (e.g. in a zigzag formation).

In the stowed configuration, adjacent upright portions may be arranged in a substantially side-by-side formation (e.g. in a zigzag formation).

In the stowed configuration, adjacent lateral portions may be arranged in a substantially side-by-side formation (e.g. in a zigzag formation).

The length of each of the lateral portions and upright portions may be substantially equal. Thus, in the stowed configuration the lateral portions and upright portions may be more efficiently stacked together in a side-by-side formation.

In the stowed configuration, the primary upright section (and upright lift parts of the primary upright section), the lateral portions, and the upright portions may be arranged in a substantially side-by-side formation (e.g. a zigzag formation).

In the stowed configuration, each of the primary upright section (and upright lift parts of the primary upright section), the lateral portions, and the upright portions may be substantially upright.

In the stowed configuration, the lateral portions, upright portions, and primary upright section (upright lift parts) may form a substantially cuboidal structure. Thus, the stowed configuration is more compact and makes efficient use of space.

In the deployed configuration, the longitudinal axis of the primary upright section and the longitudinal axis of the secondary upright section may be substantially parallel, and optionally those axes may be substantially perpendicular to the longitudinal axis of the lateral section. In the deployed configuration, the longitudinal axis of each of the upright portions and the longitudinal axis of the primary upright section (and upright lift parts of the primary upright section) may be substantially parallel. In the deployed configuration, the longitudinal axis of each of the lateral portions may be perpendicular relative to the longitudinal axis of the primary upright section (and upright lift parts of the primary upright section) and the longitudinal axis of each of the upright portions.

In the stowed configuration, the longitudinal axis of each of the primary upright section, the lateral section and the secondary upright section may be substantially parallel. In the stowed configuration, the longitudinal axis of each of the primary upright section (and upright lift parts of the primary upright section), the lateral portions and the upright portions may be substantially parallel.

In the stowed configuration, the lateral portions and upright portions may have a combined cross-section that is substantially circular, square, or rectangular (preferably square). The lateral portions and upright portions may each have a substantially square/rectangular cross-section. Thus, the footprint of the lateral and upright portions is minimised in the stowed configuration ensuring efficient use of space.

The vehicle may further comprise an engagement area configured to receive all or part of the boom apparatus when in the stowed configuration. The engagement area may be configured to receive one end of the boom apparatus when in the stowed configuration. The engagement area may be provided at a position corresponding to one end of the boom apparatus when in the stowed configuration. The engagement area may be recessed with respect to a loading surface of the vehicle. The engagement area may comprise an aperture in the loading surface. Thus the engagement area allows the end of the boom apparatus to project past the loading surface of the vehicle ensuring the boom apparatus is stowed most efficiently. In addition, the engagement area may also provide support to the boom apparatus to ensure that lateral and vertical loads through the connector are minimised.

The boom apparatus may comprise one or more support stops configured to provide structural support to the boom apparatus when in the stowed configuration. One or more of the support stops may be configured to bear lateral and/or vertical loads experienced by the boom apparatus when in the stowed configuration. Thus, the provision of support stops provides reduces the likelihood that the pivotable connections of the boom apparatus are damaged during motion of the vehicle.

The support stops may comprise one or more lift part stops configured to bear loads experienced by one or more parts of the primary upright section. The lift part stop may be provided between the first lift part and second lift part. The lift part stop may be provided at a position at least half the length of the first/second lift part from the connector when in the stowed configuration. Thus, the provision of lift part stops can reduce loads experienced through the pivotable connection that connects the lift parts of the primary upright section.

The support stops may comprise one or more lateral portion stops configured to bear loads experienced by one or more portions of the lateral section. The lateral portion stop may be provided between the first lateral portion and second lateral portion. The lateral portion stop may be provided at a position at least half the length of the first/second lateral portion from the connection between them when in the stowed configuration. Thus, the provision of lateral portion stops can reduce loads experienced through the pivotable connection that connects the lateral portions to one another and the second lift part and first upright portion respectively.

The support stops may comprise one or more upright portion stops configured to bear loads experienced by one or more portions of the secondary upright section. The upright portion stop may be provided between the first upright portion and second upright portion. The upright portion stop may be provided at a position at least half the length of the first/second upright portion from the connection between them when in the stowed configuration. Thus, the provision of upright portion stops can reduce loads experienced through the pivotable connection that connects the upright portions to one another and the second lateral portion respectively.

The support stops may comprise one or more horizontal stops configured to bear lateral loads experienced by the boom apparatus. The horizontal stop may comprise a surface against which the boom apparatus can rest. The horizontal stop may extend vertically adjacent to one side of the boom apparatus. The horizontal stop may be at least half the length of the boom apparatus when in the stowed configuration. The horizontal stop may extend from a loading surface of the vehicle. The horizontal stop may comprise a post. The horizontal stop may be provided on a rearward side of the boom apparatus when in the stowed configuration. The horizontal stop may be provided adjacent the second upright portion when in the stowed configuration. Thus, the provision of horizontal stops provides further lateral load bearing capability which reduces the likelihood that the pivotable connections of the boom apparatus are damaged during motion of the vehicle.

The support stops may comprise one or more vertical stops configured to bear the weight of the boom apparatus when in the stowed configuration. The vertical stop may be provided at an end of the boom apparatus when in the stowed configuration. The vertical stop may be provided between the boom apparatus and the vehicle. The vertical stop may be provided on an end of the first upright portion. The vertical stop may be provided between the boom apparatus and an engagement area of the vehicle. Thus, the vertical stop(s) ensure that the weight of the boom apparatus in the stowed configuration is transferred effectively to the vehicle without excessive loads being transferred through the pivotable connections of the boom apparatus.

When moving from the deployed configuration to the stowed configuration, one or more of: the primary upright section (and upright lift parts); lateral portions; and upright portions, may be configured to pivot out of the plane of the boom apparatus. This allows more efficient stowing compared to systems that only pivot in the plane of the boom apparatus.

When moving from the deployed configuration to the stowed configuration, the second upright portion may be configured to pivot either in, or out, of the plane of the boom apparatus. Preferably, the second upright portion may be configured to pivot (with respect to the first upright portion) out of the plane of the boom apparatus. When moving from the deployed configuration to the stowed configuration, the second upright portion may be configured to move to a position laterally adjacent to the first upright portion.

When moving from the deployed configuration to the stowed configuration, the first upright portion may be configured to pivot either in, or out, of the plane of the boom apparatus. Preferably, the first upright portion may be configured to pivot (with respect to the lateral section/second lateral portion) inwardly in the plane of the boom apparatus. When moving from the deployed configuration to the stowed configuration, the first upright portion may be configured to move to a position beneath the second lateral portion.

When moving from the deployed configuration to the stowed configuration, the second lateral portion may be configured to pivot either in, or out, of the plane of the boom apparatus. Preferably, the second lateral portion may be configured to pivot (with respect to the first lateral portion) out of the plane of the boom apparatus. When moving from the deployed configuration to the stowed configuration, the second lateral portion may be configured to move to a position laterally adjacent to the first lateral portion.

When moving from the deployed configuration to the stowed configuration, the first lateral portion may be configured to pivot either in, or out, of the plane of the boom apparatus. Preferably, the first lateral portion may be configured to pivot (with respect to the primary upright section/second lift part) in the plane of the boom apparatus. When moving from the deployed configuration to the stowed configuration, the first lateral portion may be configured to move to an upright position.

When moving from the deployed configuration to the stowed configuration, the second lift part may be configured to pivot either in, or out, of the plane of the boom apparatus. Preferably, the second lift part may be configured to pivot (with respect to the first lift part) out the plane of the boom apparatus. When moving from the deployed configuration to the stowed configuration, the second lift part may be configured to move towards a centre of the vehicle. Thus, the boom apparatus is efficiently stowed within the vehicle.

The radiation detector module may be provided in or on one, more or each of the primary upright section, the lateral section, and the secondary upright section. Where the radiation detector module is provided in or on the lateral section, the radiation detector module may be provided in or on one, more or each of the lateral portions. Where the radiation detector module is provided in or on the secondary upright section, the radiation detector module may be provided in or on one, more or each of the upright portions.

In some embodiments, the radiation detector module is provided in the hollow structure (e.g. internal lattice area) of one, more or each of the primary upright section, the lateral section and the secondary upright section. Where the radiation detector module is provided in the hollow structure (e.g. internal lattice area) of the lateral section, the radiation detector module may be provided in the hollow structure (e.g. internal lattice area) of one, more or each of the lateral portions. Where the radiation detector module is provided in the hollow structure (e.g. internal lattice area) of the secondary upright section, the radiation detector module may be provided in the hollow structure (e.g. internal lattice area) of one, more or each of the upright portions. By providing the radiation detector module in the hollow structure, e.g. internal lattice area, the boom apparatus is capable of more efficiently utilising space, particularly in the stowed configuration.

The radiation detector module may comprise one or more radiation detector units. Preferably, the radiation detector module is an x-ray detector module.

The boom apparatus may further comprise the radiation emitter module. The radiation emitter module may be provided in or on one, more or each of the primary upright section, the lateral section, and the secondary upright section. In embodiments, the radiation emitter module is provided in or on the primary upright section. In alternative embodiments, the radiation emitter module is provided on the vehicle of the system, e.g. adjacent to the primary upright section.

The radiation emitter module may comprise one or more radiation emitter units. Preferably, the radiation emitter module is an x-ray emitter module.

The boom apparatus may be movable between the deployed configuration and the stowed configuration using any suitable means, e.g. electric means, hydraulic means and/or pneumatic means.

The boom apparatus may comprise an actuator assembly operative to move the boom apparatus between the deployed configuration and the stowed configuration.

The actuator assembly may comprise an electric actuator assembly, a hydraulic actuator assembly, and/or a pneumatic actuator assembly.

The electric actuator assembly may comprise a controller area network (CAN-BUS).

The hydraulic actuator assembly may comprise one or more cylinder and piston arrangements each comprising a cylinder and a piston, each cylinder and piston arrangement being fluidly connected to a pump. A cylinder and piston arrangement may be connected between one, more or each of: the primary upright section and the lateral section (e.g. the first lateral portion); adjacent lateral portions (e.g. the first lateral portion and the second lateral portion); the lateral section and the secondary upright section (e.g. the second lateral portion and the first upright portion); and adjacent upright portions (e.g. the first upright portion and the second upright portion).

The boom apparatus may comprise a control unit for controlling movement of the boom apparatus between the deployed configuration and the stowed configuration. The control unit may be provided, for example, on the primary upright section.

The control unit may be operatively connected to the actuator assembly.

The vehicle of the system may be an automotive vehicle such as a wagon, a truck or a trailer.

The vehicle of the system may comprise a loading platform. The primary upright section may be mountable on the loading platform.

In the stowed configuration, the height of the boom apparatus when mounted on the vehicle may be no more than 6 m, suitably no more than 5 m, suitably no more than 4.5 m, preferably no more than 4.4 m, preferably no more than 4.3 m, preferably no more than 4.2 m, preferably no more than 4 m, preferably no more than 3.5 m, preferably no more than 3.2 m, preferably no more than 3 m, preferably no more than 2.8 m, preferably no more than 2.5 m. The skilled person will appreciate that the height of the boom apparatus may be varied as desired or required.

In the stowed configuration, the length of the boom apparatus may be less than the length and/or the width of the vehicle on which it is mounted. In the stowed configuration, the longitudinal axis of each of the primary upright section, the lateral section (e.g. each of the lateral portions) and the secondary upright section (e.g. each of the upright portions) may be perpendicular to the longitudinal axis of the vehicle and/or perpendicular to the plane of the loading platform of the vehicle. In the stowed configuration, the boom apparatus may be contained within an area defined by the footprint of the vehicle. In the stowed configuration, the boom apparatus may not extend over an edge of the vehicle. Thus, the boom apparatus may be stowed across the platform rather than along the length of the platform. The boom apparatus is therefore more compact and allows additional equipment to be loaded to the vehicle or a smaller vehicle to be used.

According to a second aspect of the present invention there is provided an article scanning system comprising: a boom apparatus according to the first aspect of the present invention; and a vehicle on which the primary upright section is mounted.

The vehicle may be as defined in relation to the first aspect of the present invention.

The primary upright section may be mounted towards or at the rear end of the vehicle. The primary upright section may be mounted on the loading platform of the vehicle, optionally at or towards the rear end of the loading platform. In this way, the area of the loading platform between the boom apparatus and the cab of the vehicle may be utilised, and/or a shorter vehicle may be used.

The article scanning system may comprise a radiation emitter module. The radiation emitter module may be as defined in relation to the first aspect of the present invention.

The radiation emitter module may be mounted on the vehicle. The radiation emitter module may be mounted towards or at the rear end of the vehicle. The radiation emitter module may be mounted on the loading platform of the vehicle, optionally at or towards the rear end of the loading platform. The radiation emitter module may be arranged adjacent to the boom apparatus.

The radiation emitter module may be movably mounted on the vehicle.

The radiation emitter module may be pivotally mounted on the vehicle. This may be achieved using any suitable means. The radiation emitter module may be pivotable about a lateral axis. The lateral axis is perpendicular to the upright axis. The radiation emitter module may be pivotable substantially in the plane of the boom apparatus as arranged in the deployed configuration.

The radiation emitter module may be slidably mounted, e.g. in the upright direction, on the vehicle. This may be achieved using any suitable means. For example, the system may comprise a slide and guide arrangement comprising a slide and a guide. The radiation emitter module may be pivotally connected to the slide, wherein the slide is slidably mounted to the guide so as to be slidable in the upright direction relative to the guide, the guide being fixed to the vehicle.

Accordingly, the angular position (the pitch) and/or the height of the radiation emitter module can be varied. Thus, by adjusting the pitch of the radiation emitter module and/or the height of the primary upright section, the position of the scanning envelope of the radiation emitter module can be varied and optimised in accordance with the size of an article (e.g. a vehicle) to be scanned.

Optionally, the article is a vehicle, e.g. a car, a truck or a lorry. In this way, the system may be a vehicle scanning system which is capable of scanning vehicles (vehicles to be scanned), e.g. cars, trucks or lorries, using a radiation detector module and a radiation emitter module.

According to a third aspect of the present invention there is provided a method of stowing a boom apparatus according to the first aspect of the present invention, the method comprising the steps of:

providing the boom apparatus in the deployed configuration; and moving the boom apparatus from the deployed configuration to the stowed configuration.

The moving step may comprise (A) arranging the secondary upright section in the collapsed arrangement, optionally such that the upright portions are arranged substantially side-by-side, optionally in a zigzag formation. The moving step may comprise rotating the secondary upright portion (with respect to the first upright portion) out of the plane of the boom apparatus.

The moving step may comprise (B) arranging the secondary upright section and the lateral section substantially side-by-side, optionally in a zigzag formation. The moving step may comprise rotating the first upright portion (with respect to the lateral section/second lateral portion) in the plane of the boom apparatus.

The moving step may comprise (C) arranging the lateral section in the collapsed arrangement, optionally such that the lateral portions are arranged substantially side-by-side, optionally in a zigzag formation. The moving step may comprise rotating the second lateral section (with respect to the first lateral portion) out of the plane of the boom apparatus.

The moving step may comprise (D) arranging the lateral section and the primary upright section substantially side-by-side, optionally in a zigzag formation. The moving step may comprise rotating the first lateral section (with respect to the primary upright section/second lift part) in the plane of the boom apparatus.

The moving step may comprise (E) adjusting the height of the primary upright section (e.g. into a collapsed arrangement). The moving step may comprise arranging the upright lift parts of the primary upright section substantially side-by-side, optionally in a zigzag formation. The moving step may comprise rotating the second lift part (with respect to the first lift part) out of the plane of the boom apparatus and optionally towards a centre of the vehicle.

In the moving step, (A), (B), (C), (D) and (E) may be performed sequentially, with (A) before (B) and (B) before (C) and (C) before (D) and (D) before (E). One or more of the steps may be omitted.

According to a fourth aspect of the present invention there is provided a method of deploying a boom apparatus according to a first aspect of the present invention, the method comprising the steps of: providing the boom apparatus in the stowed configuration; and moving the boom apparatus from the stowed configuration to the deployed configuration.

The moving step may comprise (I) adjusting the height of the primary upright section (e.g. into an extended arrangement). The moving step may comprise arranging the upright lift parts of the primary upright section in a substantially linear formation. The moving step may comprise rotating the second lift part (with respect to the first lift part) out of the plane of the boom apparatus and optionally away from a centre of the vehicle.

The moving step may comprise (II) moving the lateral section relative to the primary upright section (e.g. rotating the lateral section relative to the primary upright section), optionally such that the lateral section and the primary upright section are substantially perpendicular. The moving step may comprise rotating the first lateral portion (with respect to the primary upright section/second lift part) in the plane of the boom apparatus.

The moving step may comprise (III) arranging the lateral section in the extended arrangement, optionally such that the lateral portions are arranged in a substantially linear formation (i.e. axially). The moving step may comprise rotating the second lateral portion (with respect to the first lateral portion) out of the plane of the boom apparatus.

The moving step may comprise (IV) moving the secondary upright section relative to the lateral section (e.g. rotating the secondary upright section relative to the lateral section), optionally such that the secondary upright section and the lateral section are substantially perpendicular. The moving step may comprise rotating the first upright portion (with respect to the lateral section/second lateral portion) in the plane of the boom apparatus.

The moving step may comprise (V) arranging the second upright section in the extended arrangement, optionally such that the upright portions are arranged in a substantially linear formation (i.e. axially). The moving step may comprise rotating the second upright portion (with respect to the first upright portion) out of the plane of the boom apparatus.

In the moving step, (I), (II), (III), (IV) and (V) may be performed sequentially, with (I) before (II) and (II) before (III) and (III) before (IV) and (IV) before (IV). One or more of the steps may be omitted.

Any feature of any aspect of the present invention may be combined with any feature of any other aspect of the present invention, in any suitable manner as would be understood by a person skilled in the art.

For example, the boom apparatus of the first aspect of the present invention or the article scanning system of the second aspect of the present invention may be operable to perform any of the method steps as defined in relation to the third or fourth aspect of the present invention. Similarly, the method of the third or fourth aspect of the present invention may include any features of the boom apparatus of the first aspect of the present invention or the article scanning system of the second aspect of the present invention.

DETAILED DESCRIPTION OF THE INVENTION

In order that the invention may be more clearly understood one or more embodiments thereof will now be described, by way of example only, with reference to the accompanying drawings, of which:

FIG. 11 shows a front view of an article scanning system of a second embodiment of the present invention, wherein the boom apparatus is arranged in a deployed configuration;

FIG. 12 shows a rear view of the article scanning system of FIG. 11, wherein the boom apparatus is arranged in the deployed configuration;

FIG. 33 shows another cut-away view the article scanning system of FIG. 24, wherein the boom apparatus is in the stowed configuration.

Figure 1:
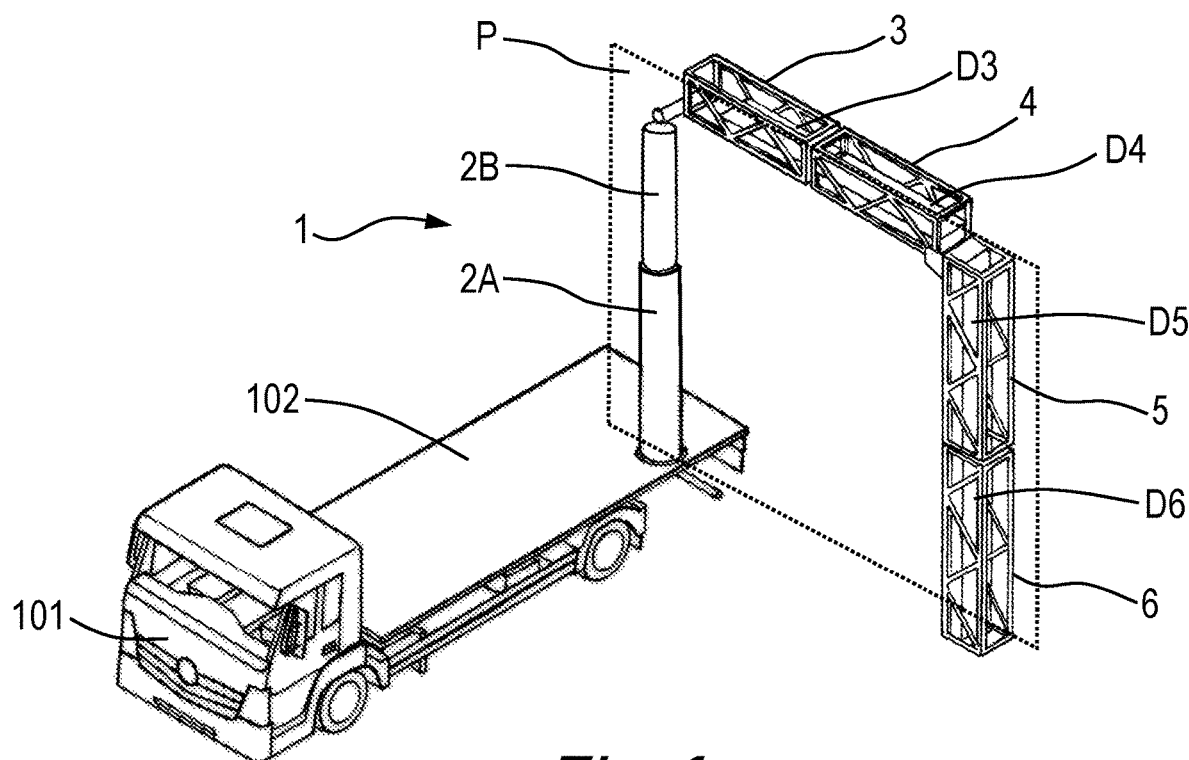
FIG. 1 shows a perspective view of an article scanning system according to a first embodiment of the present invention, wherein the boom apparatus is arranged in a deployed configuration.

With reference to FIGS. 1-10, an article scanning system according to a first embodiment of the invention comprises a boom apparatus 1, and a truck 100 having a cab 101 and a loading platform 102. In this particular embodiment, the article scanning system is a vehicle scanning system, which is capable of scanning vehicles for illicit items.

The boom apparatus 1 comprises a primary upright section 2 mounted towards a rear end 103 of the loading platform 102; a lateral section 3, 4; and a secondary upright section 5, 6.

Figure 3:
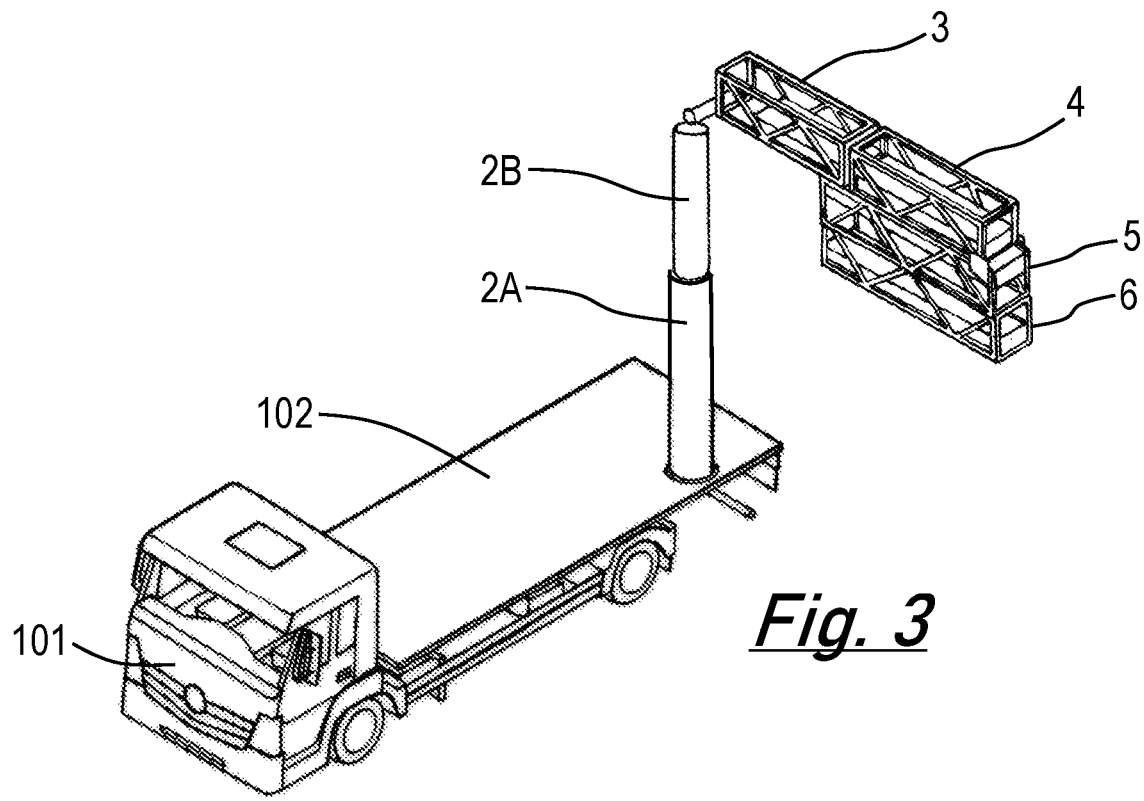
FIG. 3 shows the article scanning system of FIG. 1, wherein the boom apparatus is at another stage of moving from the deployed configuration to the stowed configuration.

The primary upright section 2 has a first lift part 2A and a second lift part 2B, each of which is substantially cylindrical, as shown, for example, in FIG. 3. An end of the first lift part 2A is provided with a circumferential flange which is fastened to the rear end 103 of the loading platform 102 using bolts, distal the cab 101. The skilled person will recognise that any suitable fastening means may be used to mount the primary upright section 2 on the loading platform 102. The primary upright section 2 is arranged upright, with its longitudinal axis perpendicular to the plane of the loading platform 102 (and perpendicular to the plane of the ground during normal use).

The second lift part 2B is telescopically mounted within, and axially movable relative to, the first lift part 2A. The first lift part 2A and the second lift part 2B are approximately of the same length and are coaxial. The telescopic nature of the primary upright section 2 is such that the second lift part 2B can be extended out of the first lift part 2A or retracted within, and substantially surrounded by, the first lift part 2A. In other words, in a collapsed arrangement, the second lift part 2A sits concentrically within the first lift part 2A. The height of the primary upright section 2 in the collapsed arrangement is approximately half of the height of the primary upright section 2 in the fully extended arrangement. The height of the boom apparatus 1 may be varied by adjusting the position of the second lift part 2B relative to the first lift part 2A.

The lateral section 3, 4 comprises a first lateral portion 3 and a second lateral portion 4. Each lateral portion 3, 4 is elongate, substantially rectangular, and formed of a lattice structure having a plurality of metal beams joined at nodes to define an internal lattice area.

The secondary upright section 5, 6 comprises a first upright portion 5 and a second upright portion 6. Each upright portion 5, 6 is elongate, substantially rectangular, and formed of a lattice structure having a plurality of metal beams joined at nodes to define an internal lattice area.

An end of the first lateral portion 3 and an end of the second lift part 2B (i.e. the end distal the first lift part 2A) are pivotally connected such that the angle between first lateral portion 3 and the second lift part 2B can be between 0 and 90 degrees.

The other end of the first lateral portion 3 and an end of the second lateral portion 4 are pivotally connected such that the angle between the first lateral portion 3 and the second lateral portion 4 can be between 0 and 180 degrees.

The other end of the second lateral portion 4 and an end of the first upright portion 5 are pivotally connected such that the angle between first lateral portion 4 and the first upright section 5 can be between 0 and 90 degrees.

The other end of the first upright portion 5 and an end of the second upright portion 6 are pivotally connected such that the angle between the first upright portion 5 and the second upright portion 6 can be between 0 and 180 degrees.

The other end of the second upright portion 6 is free, i.e. not connected to anything else, e.g. as shown in FIG. 1.

The article scanning system further comprises an x-ray detector module D and an x-ray emitter module E. The x-ray detector module D is operable to detect x-ray radiation emitted by the x-ray emitter module E (not shown). The emitted x-rays cover a space which is referred to herein as 'the scanning envelope'.

The scanning envelope defines a plane SE (not shown in FIGS. 1-10, but is shown in FIGS. 11-20, and is substantially the same between the different embodiments). The plane SE is substantially parallel to and overlaps with the plane P of the boom apparatus 1 in the deployed configuration (defined hereinbelow).

Any suitable x-ray detector module D and x-ray emitter module E may be used and those are well known to those skilled in the art. The structure and operation of such an x-ray detector module D and an emitter module E are well known in the art and will not be described in further detail herein.

Figure 4:
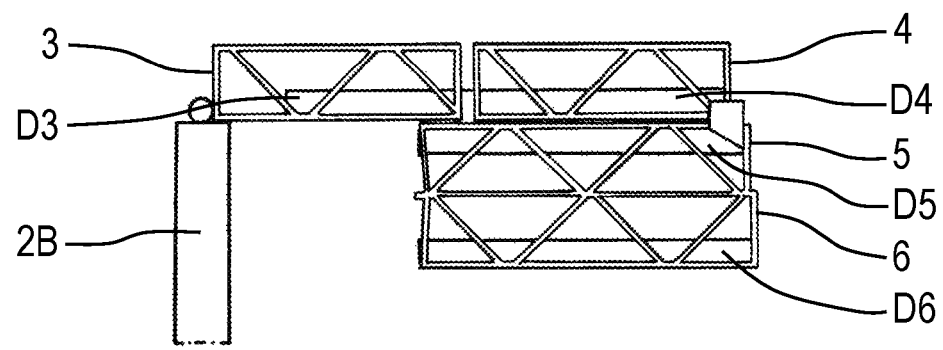
FIG. 4 shows a partial front view of the boom apparatus of FIG. 3.

The x-ray detector module D comprises four detector units D3, D4, D5, D6, see e.g. FIGS. 1 and 4. Each detector unit D3-D6 is provided within the internal lattice area of a respective lateral portion or upright portion. That is, the internal lattice area of the first lateral portion 3 comprises a detector unit D3, the internal lattice area of the second lateral portion 4 comprises a detector unit D4, the internal lattice area of the first upright portion 5 comprises a detector unit D5, and the internal lattice area of the second upright portion 6 comprises a detector unit D6.

The x-ray emitter module E is arranged behind the primary upright portion 2 and at the rear of the loading platform 103 (not shown).

Figure 9:
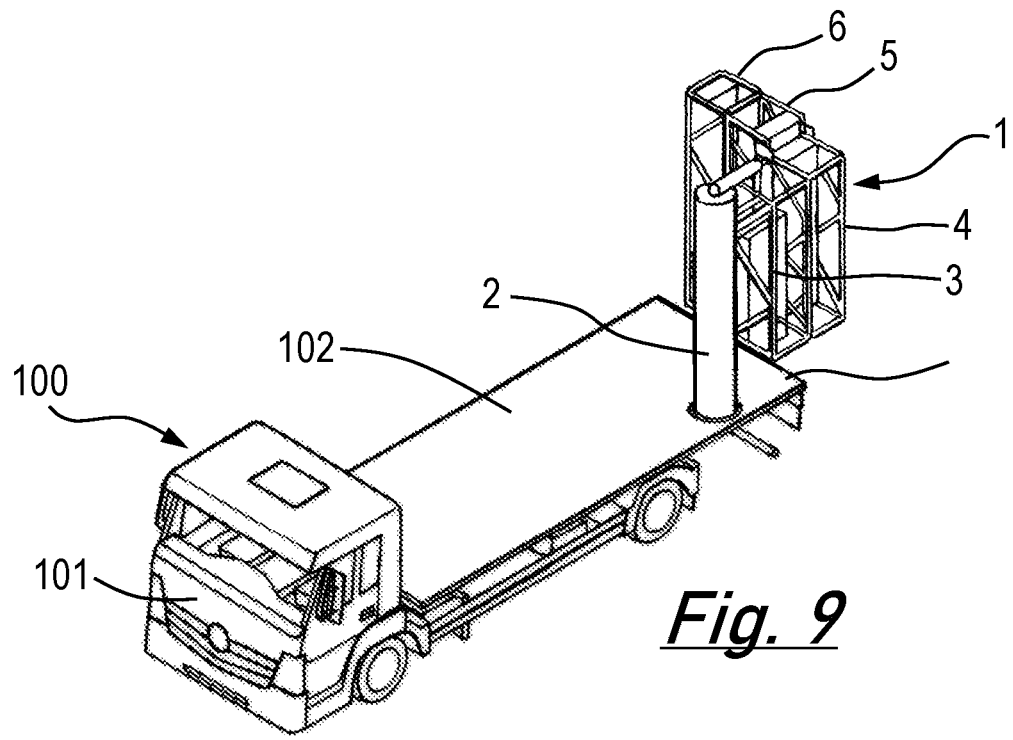
FIG. 9 shows the article scanning system of FIG. 1, wherein the boom apparatus is arranged in the stowed configuration.
Figure 10:
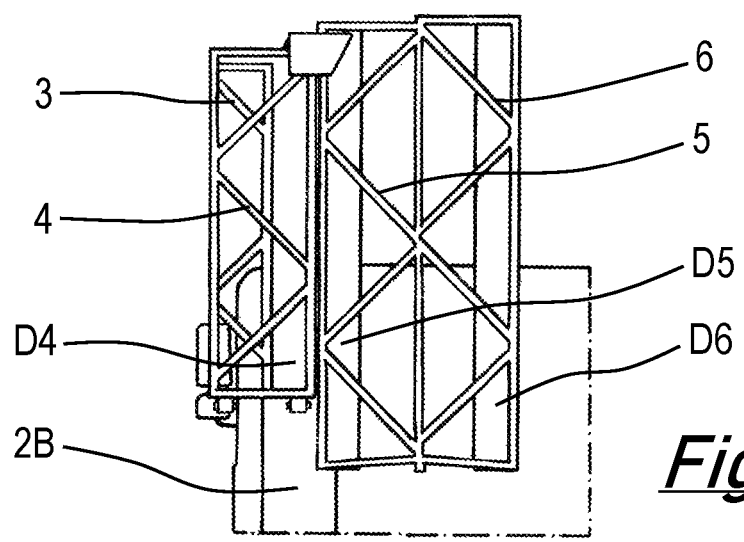
FIG. 10 shows a partial rear view of the boom apparatus of FIG. 9.

The boom apparatus 1 is movable between a deployed configuration (see FIG. 1) and a stowed configuration (see FIGS. 9 and 10).

In the deployed configuration: the primary upright section 2 is the above-described fully extended arrangement in which the second lift part 2B is fully extended out of the first lift part 2A (although the primary upright section 2 may alternatively be in a different, e.g. a partially extended or collapsed, arrangement); the angle between the longitudinal axis of the second lift part 2B and the longitudinal axis of the first lateral portion 3 is around 90 degrees; the first lateral portion 3 and the second lateral portion 4 are arranged axially (i.e. linearly), with the angle between the longitudinal axis of the first lateral portion 3 and the longitudinal axis of the second lateral portion 4 at around 180 degrees; the angle between the longitudinal axis of the second lateral portion 4 and the longitudinal axis of the first upright portion 5 is around 90 degrees; and the first upright portion 5 and the second upright portion 6 are arranged axially (i.e. linearly), with the angle between the longitudinal axis of the first upright portion 5 and the longitudinal axis of the second upright portion 6 being around 180 degrees. Further, in the deployed configuration, the boom apparatus defines a substantially inverted-U-shaped structure through which an article to be scanned, such as a vehicle, e.g. a car, can pass (see FIG. 1). The plane P of the inverted-U-shaped structure may be referred to herein as the plane of the boom apparatus in the deployed configuration, and is shown in FIG. 1.

In this particular embodiment, in the deployed configuration, the boom apparatus has a height of around 5500-5600 mm and a width of around 4200-4400 mm (i.e. approximately a 5500-5600 by 4200-4400 tunnel size). As those skilled in the art will appreciate, the dimensions of the boom apparatus 1 may vary depending on various factors such as the size of the articles to be scanned, and road-safety regulations which may vary from one territory to another. For example, in another embodiment, in the deployed configuration, the boom apparatus 1 has a height of around 3000 mm and a width of around 3000 m (i.e. approximately a 3000 mm by 3000 m tunnel size). In yet other embodiments, the dimensions are different.

In the stowed configuration (see FIGS. 9 and 10): the primary upright section 2 is in the above-mentioned collapsed arrangement in which the second lift part 2B is retracted within, and substantially surrounded by, the first lift part 2A (i.e. the second lift part 2B sits concentrically within the first lift part 2A); the first lateral portion 3 and the second lift part 2B are arranged side-by-side and with their longitudinal axes in parallel, and the angle between the longitudinal axis of the first lateral portion 3 and the longitudinal axis of the second lift part 2B is around 0 degrees; the first lateral portion 3 and the second lateral portion 4 are arranged side-by-side and with their longitudinal axes in parallel, and the angle between the longitudinal axis of the first lateral portion 3 and the longitudinal axis of the second lateral portion 4 is around 0 degrees; the second lateral portion 4 and the first upright portion 5 are arranged side-by-side and with their longitudinal axes in parallel, and the angle between the longitudinal axis of the second lateral portion 4 and the longitudinal axis of the first upright portion 5 is around 0 degrees; and the first upright portion 5 and the second upright portion 6 are arranged side-by-side and with their longitudinal axes in parallel, and the angle between the longitudinal axis of the first upright portion 5 and the longitudinal axis of the second upright portion 6 is around 0 degrees.

Therefore, in the stowed configuration, the second lift part 2B, the first lateral portion 3, the second lateral portion 4, the first upright portion 5 and the second upright portion 6 are arranged side-by-side in a zigzag formation and with their longitudinal axes in parallel, towards the rear end of the loading platform 103, ready for transit by the truck 100.

In this particular embodiment, in the stowed configuration, the boom apparatus 1 has a height of around 4100-4300 mm. It will be appreciated by those skilled in the art that in other embodiments the size may be different.

The boom apparatus 1 comprises a hydraulic actuator assembly operatively connected to a control unit (not shown). The hydraulic actuator assembly is operable to move the boom apparatus 1 between the deployed configuration and the stowed configuration. The control unit includes a programmable logic controller (PLC) and can be used by an operator to select the deployed configuration or the stowed configuration (to which the boom apparatus 1 then moves, as required). The control unit can also be used to vary the height of the boom apparatus 1 in the deployed configuration. The control unit is provided on the first lift portion 2A, but those skilled in the art will appreciate that it may be provided at a different location.

The hydraulic actuator assembly comprises a plurality of cylinder and piston arrangements each comprising a cylinder C and a piston P, each cylinder and piston arrangement being fluidly connected to a pump (not shown).

Figure 23:
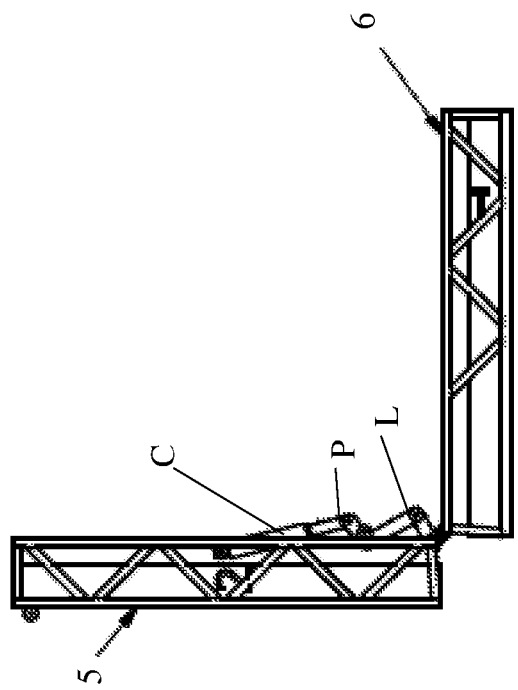
FIG. 23 shows the hydraulic actuator assembly of FIG. 22, wherein the boom apparatus is partially stowed.
Figure 22:
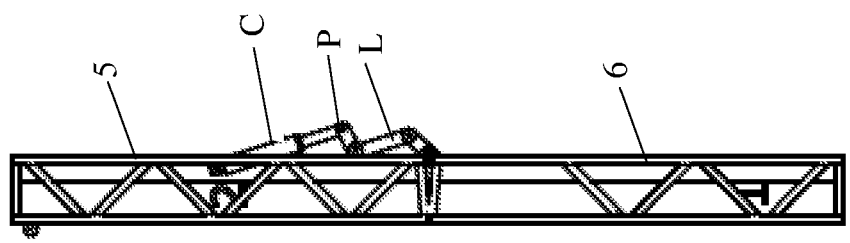
FIG. 22 shows an example of a cylinder an piston arrangement for use in any embodiment of the present invention, wherein the boom apparatus is arranged in a deployed configuration.

An example of a cylinder and piston arrangement which can be used in embodiments of the present invention is shown in FIGS. 22 and 23.

In FIGS. 22 and 23, a cylinder and piston arrangement is connected between the first upright portion 5 and the second upright portion 6. Specifically, an end of the cylinder C is connected to a part of the first upright portion 5 and an opposite end of the piston P is connected to an end of the second upright portion 6 via a linkage L.

The cylinder and piston arrangement is configured so that movement of the piston P relative to the cylinder C causes the second upright portion 6 to pivot relative to the first upright portion about the pivotal connection between the end of the first upright portion 5 and the end of the second upright portion 6.

In FIG. 22 the boom apparatus 1 is arranged in the deployed configuration wherein the first upright portion 5 and the second upright portion 6 are arranged in a substantially axial formation.

In FIG. 23 the boom apparatus 1 is partially moved towards the stowed configuration and the longitudinal axis of the first upright portion 5 and the longitudinal axis of the second upright portion 6 are substantially perpendicular.

Continued movement of the piston P into the cylinder C, will further rotate the linkage to bring the first upright portion and the second upright portions into the fully stowed configuration.

Further cylinder and piston arrangements are connected between each of: the second upright lift part 2B and the first lateral portion 3; the first lateral portion 3 and the second lateral portion 4; and the second lateral portion 4 and the first upright portion 5. Those cylinder and piston arrangements are similar in structure and connection (mutatis mutandis) to that described above in relation to the cylinder and piston arrangement connected between the first upright portion 5 and the second upright portion 6.

FIGS. 1 through 10 show the sequence of movement of the boom apparatus 1 on moving from the deployed configuration (FIG. 1) to the stowed configuration (FIGS. 9 and 10). To control movement of the boom apparatus 1 from the deployed configuration to the stowed configuration, a user selects the stowed configuration using the control unit C. If the boom apparatus 1 is not in the stowed configuration, the hydraulic actuator assembly H will actuate movement of the boom apparatus 1 to the stowed configuration.

Figure 2:
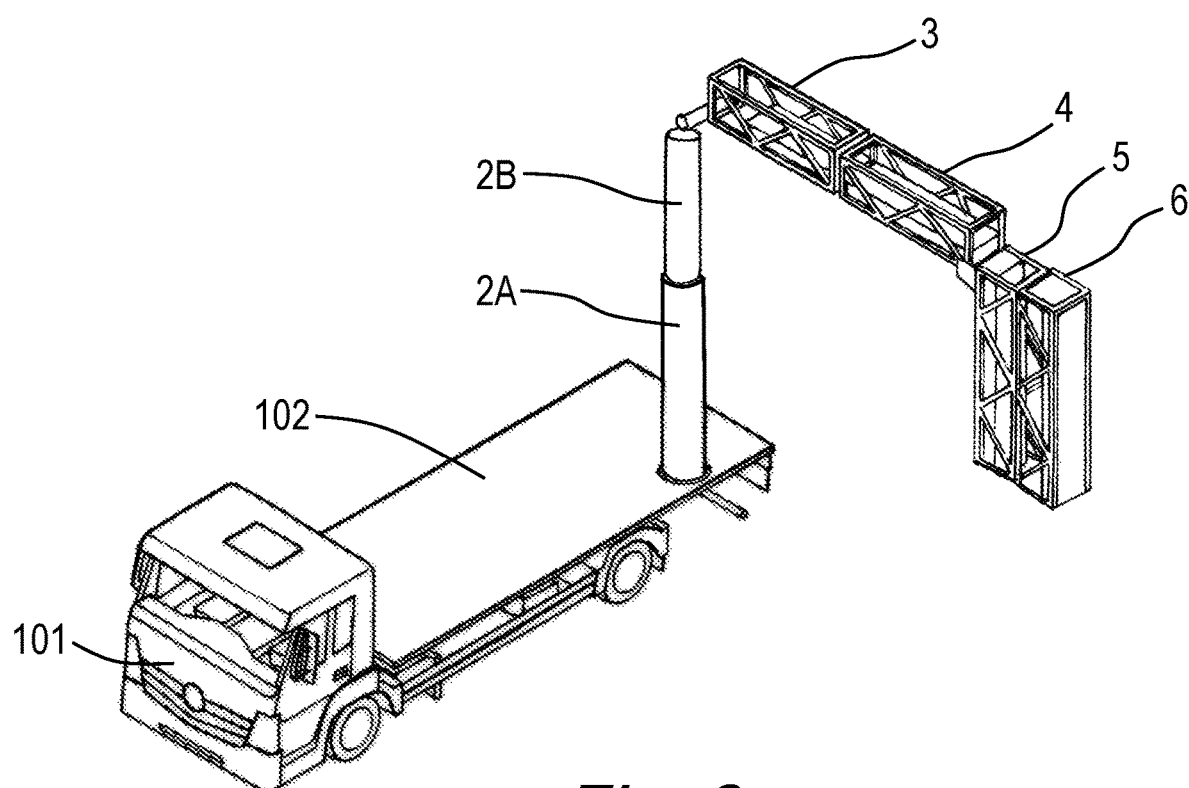
FIG. 2 shows the article scanning system of FIG. 1, wherein the boom apparatus is at a stage of moving from the deployed configuration to the stowed configuration.

The initial arrangement of the boom apparatus 1, i.e. in the deployed configuration, is shown in FIG. 1. From here, the second upright portion 6 pivots outwardly, distal the primary upright section 2, in the plane P of the boom apparatus 1, by about 180 degrees, relative to the first upright portion 5 and about the pivotal connection between the end of the first upright portion 5 and the end of the second upright portion 6, as shown in FIG. 2.

As a result, the first upright portion 5 and the second upright portion 6 are arranged side-by-side with their longitudinal axes in parallel, and the angle between the longitudinal axis of the first upright portion 5 and the longitudinal axis of the second upright portion 6 is approximately 0 degrees.

Next, the first upright portion 5 pivots inwardly, proximal the primary upright section 2, in the plane P of the boom apparatus 1, by about 90 degrees, relative to the second lateral portion 4 and about the pivotal connection between the end of the first upright portion 5 and the end of the second lateral portion 4, as shown in FIGS. 3 and 4. Thus, the first upright portion 5 and the second lateral portion 4 are arranged side-by-side with their longitudinal axes in parallel, and the angle between the longitudinal axis of the first upright portion 5 and the longitudinal axis of the second lateral portion 4 is approximately 0 degrees.

Figure 5:
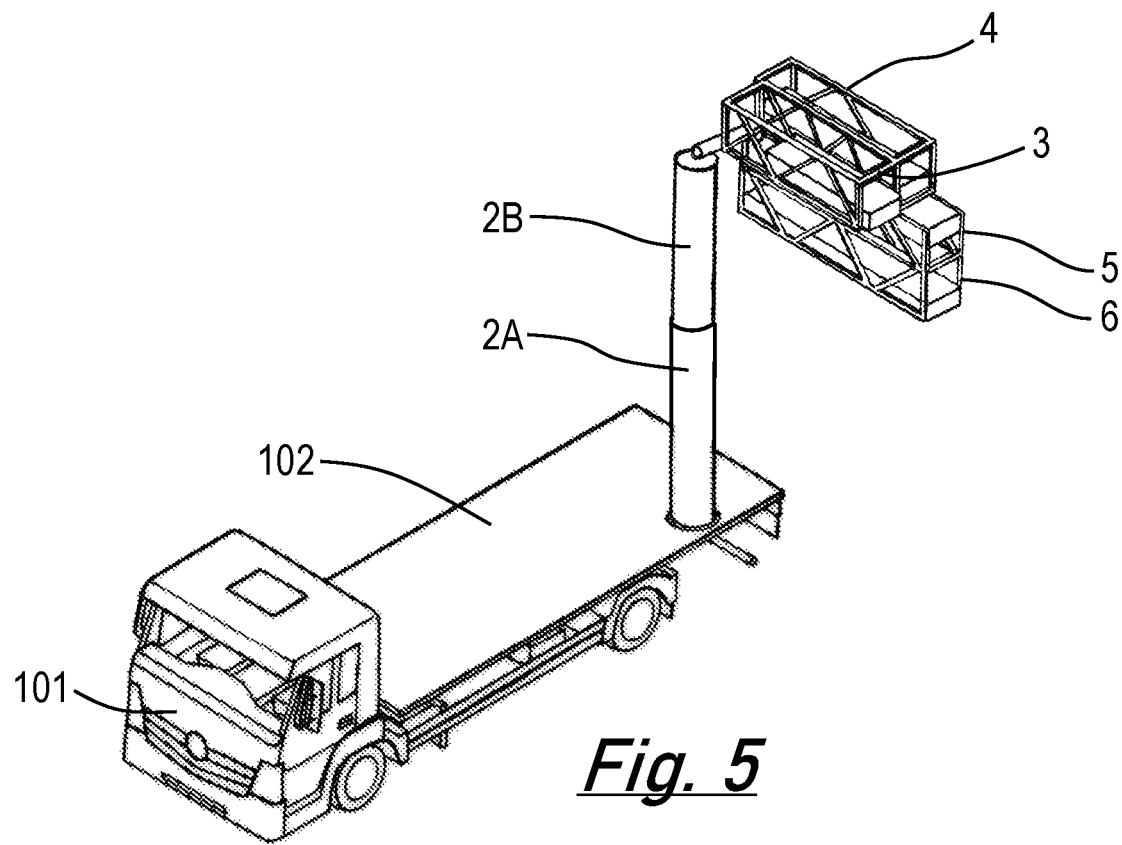
FIG. 5 shows the article scanning system of FIG. 1, wherein the boom apparatus is at another stage of moving from the deployed configuration to the stowed configuration.
Figure 6:
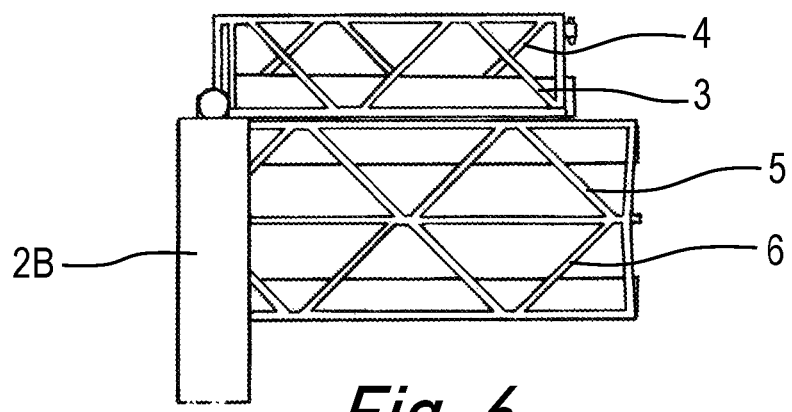
FIG. 6 shows a partial front view of the boom apparatus of FIG. 5.

Next, the second lateral portion 4 pivots in a plane perpendicular to the plane P of the boom apparatus 1, proximal the rear of the truck 103, by about 180 degrees, relative to the first lateral portion 3 and about the pivotal connection between the end of the first lateral portion 3 and the end of the second lateral portion 4, as shown in FIGS. 5 and 6.

As a result, the first lateral portion 3 and the second lateral portion 4 are arranged side-by-side with their longitudinal axes in parallel, and the angle between the longitudinal axis of the first lateral portion 3 and the longitudinal axis of the second lateral portion 4 is approximately 0 degrees.

Figure 7:
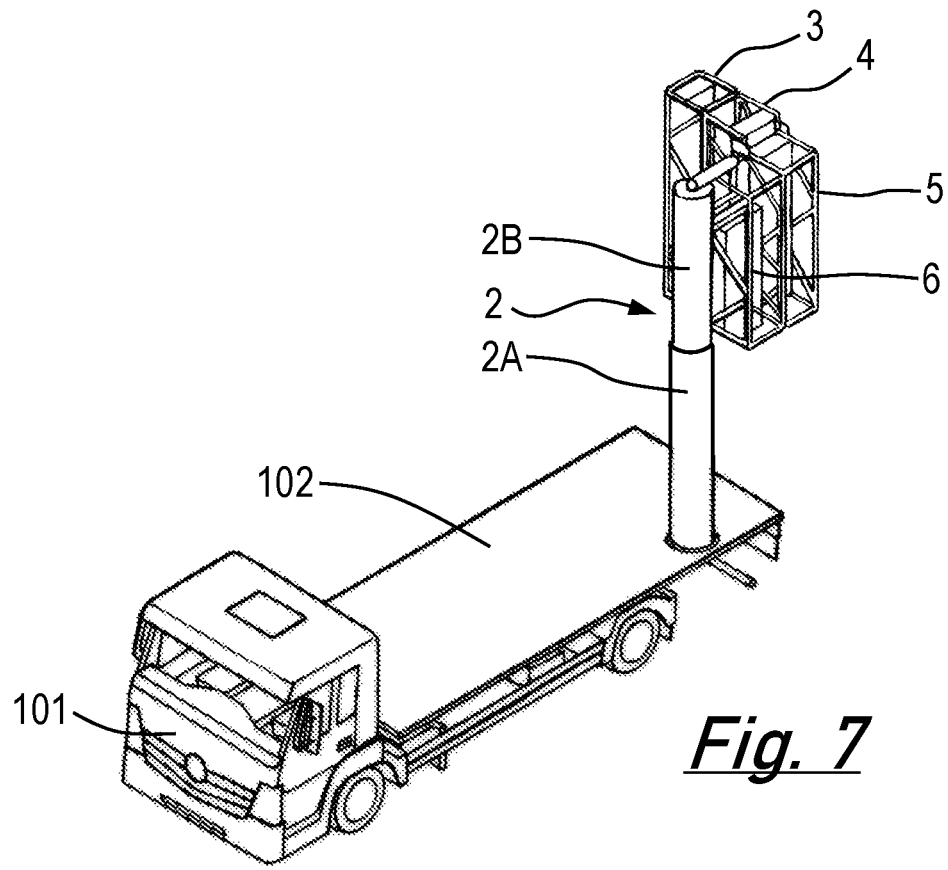
FIG. 7 shows the article scanning system of FIG. 1, wherein the boom apparatus is at another stage of moving from the deployed configuration to the stowed configuration.
Figure 8:
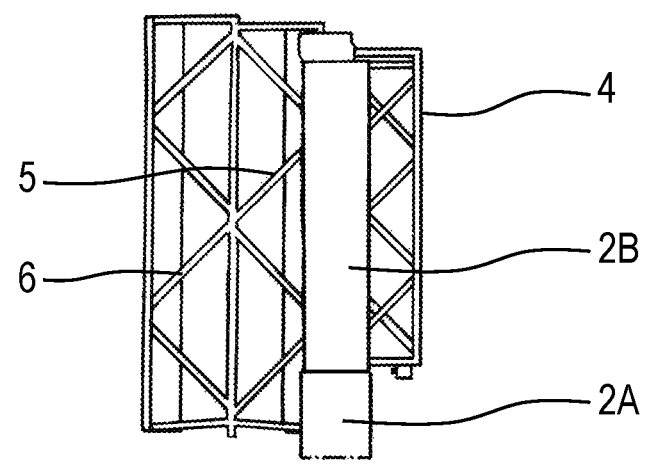
FIG. 8 shows a partial front view of the boom apparatus of FIG. 7.

Next, the first lateral portion 3 pivots in the plane P of the boom apparatus 1, proximal the primary upright section 2, by about 90 degrees, relative to the second lift part 2B and about the pivotal connection between the end of the first lateral portion and the end of the second lift part 2B, as shown in FIGS. 7 and 8. Thus, the first lateral portion 3 and the second lift part 2B are arranged side-by-side with their longitudinal axes in parallel, and the angle between the longitudinal axis of the first lateral portion 3 and the longitudinal axis of the second lift part 2B is approximately 0 degrees.

Next, the second lift part 2B is lowered relative to the first lift part 2A, such that the second lift part 2B is concealed by and sits concentrically within the first lift part 2A, as shown in FIGS. 9 and 10. This is the collapsed arrangement of the primary upright section 2.

Accordingly, in the stowed configuration of the boom apparatus 1, the primary upright section 2, the lateral portions 3, 4 and the upright portions 5, 6 are arranged together side-by-side in a zigzag formation.

To move the boom apparatus 1 from the stowed configuration to the deployed configuration, an operator selects the deployed configuration using the control unit C. The hydraulic actuator assembly H would then actuate movement of the boom apparatus 1 to the deployed configuration. Those skilled in the art will appreciate that on moving from the stowed configuration to the deployed configuration, the components of the boom apparatus move in the reverse sequence to that described hereinabove.

A second embodiment of the boom apparatus 1 of the present invention is shown in FIGS. 11-16. The only difference between boom apparatus of the first and second embodiments is the structure of the primary upright section 2 (the remaining features are the same). Thus, only the structure of the primary upright section 2 is described hereinbelow.

With reference to FIGS. 11-16, the primary upright section 2 comprises a scissor lift 2B and a substantially rectangular cage 2A. The cage 2A is mounted at the rear end 103 of the loading platform 102 using bolts. The scissor lift 2B is mounted on top of the cage 2A. The scissor lift 2B is capable of being moved in the upright direction between an extended arrangement and a collapsed arrangement.

Figure 13:
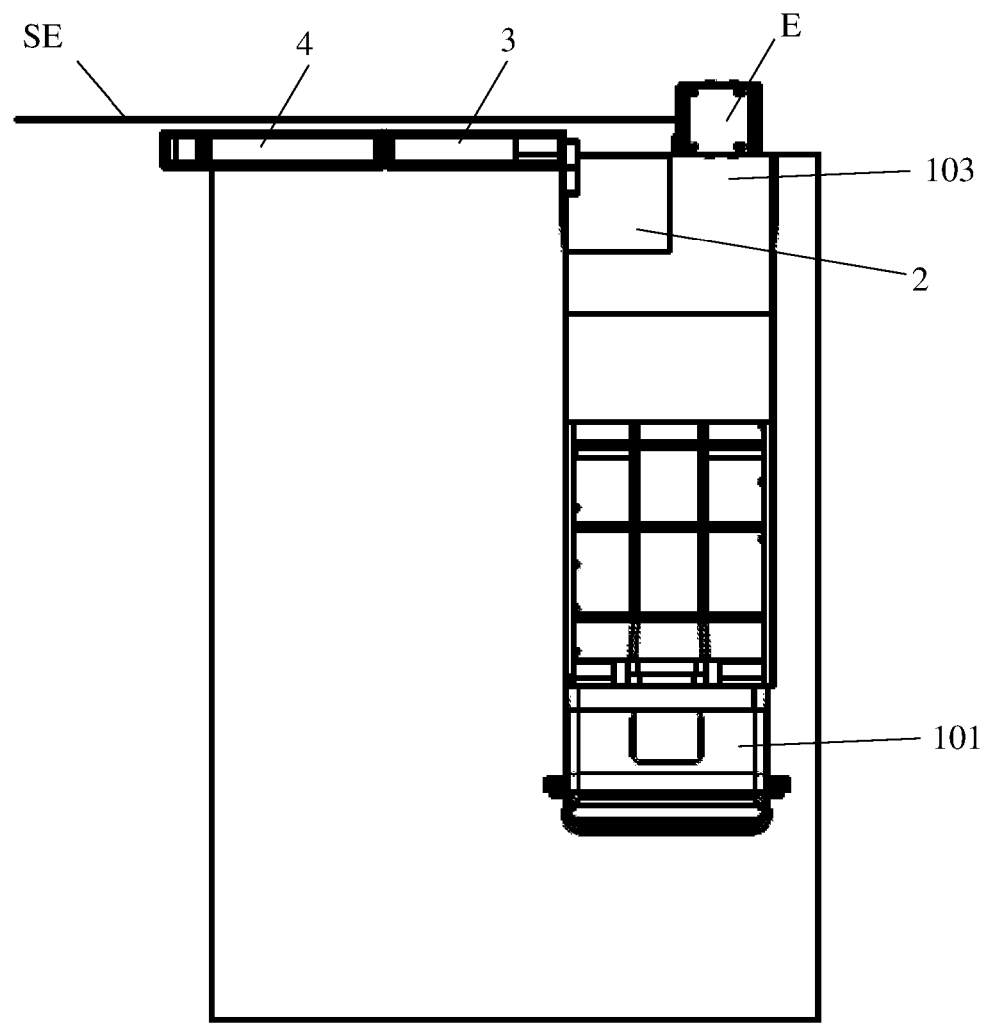
FIG. 13 shows a plan view of the article scanning system of FIG. 11, wherein the boom apparatus is arranged in the deployed configuration.
Figure 15:
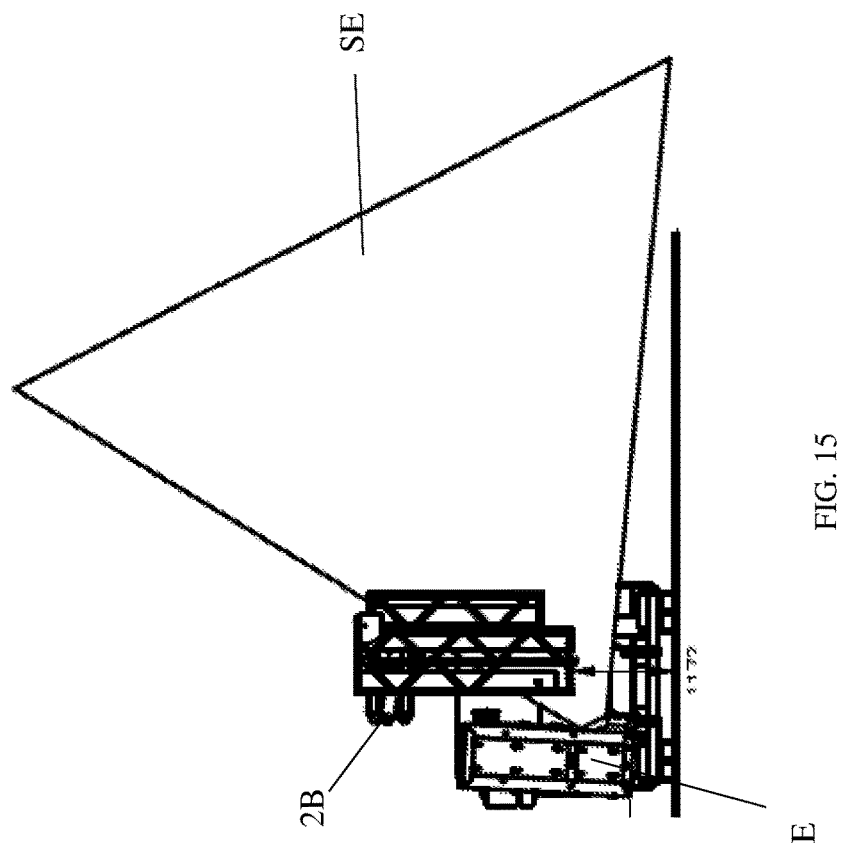
FIG. 15 shows a rear view of the article scanning system of FIG. 11, wherein the boom apparatus is arranged in the stowed configuration.
Figure 14:
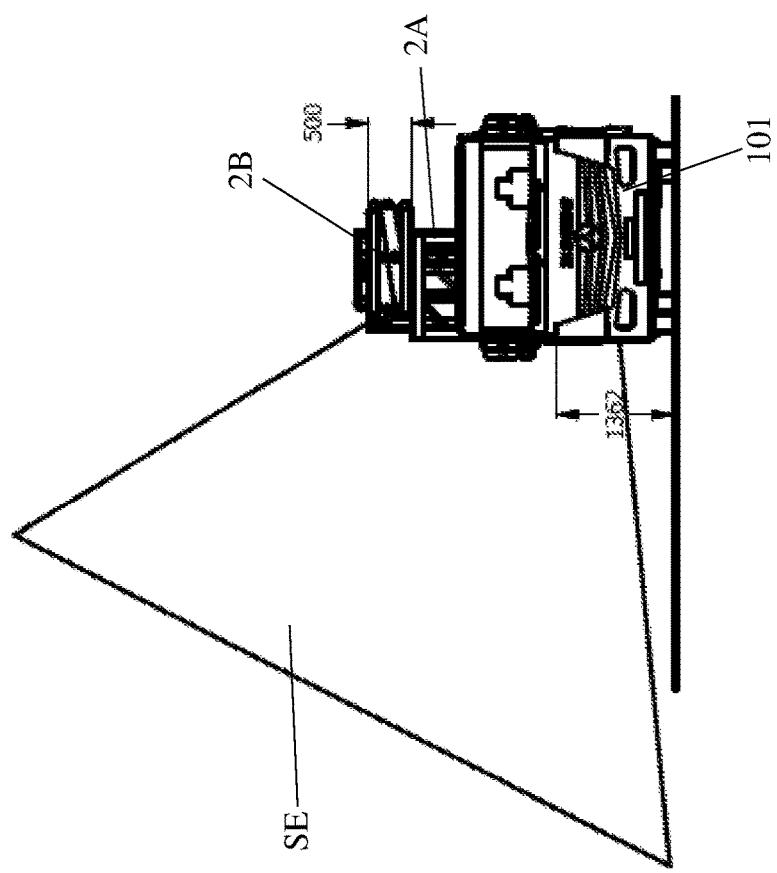
FIG. 14 shows a front view of the article scanning system of FIG. 11, wherein the boom apparatus is arranged in the stowed configuration.
Figure 16:
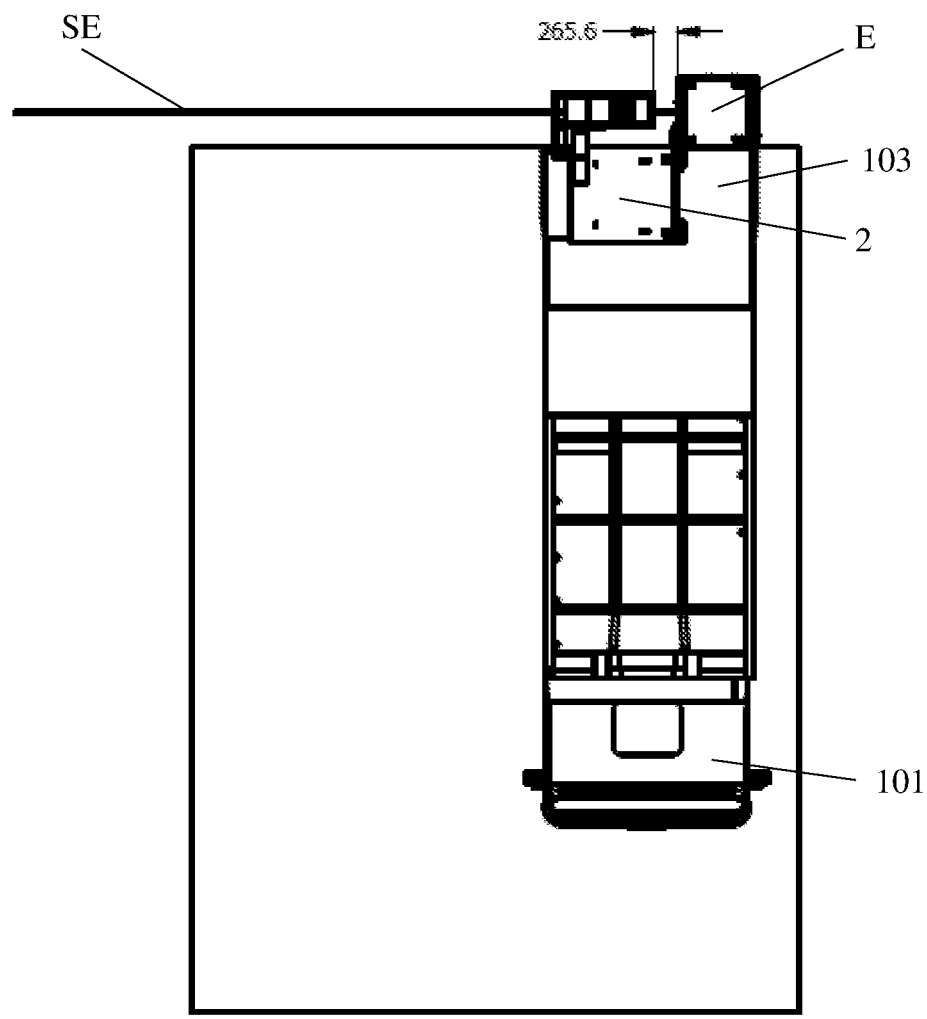
FIG. 16 shows a plan view of the article scanning system of FIG. 11, wherein the boom apparatus is arranged in a stowed configuration.

FIGS. 11-13 show the boom apparatus 1 configured in the deployed configuration in which the scissor lift 2B is in the extended arrangement. FIGS. 14-16 show the boom apparatus 1 configured in the stowed configuration in which the scissor lift 2B is in the collapsed arrangement. Further, in the stowed configuration the lateral portions 3, 4 and the upright portions 5, 6 can be lowered into the cage 2A so as to be protected by the cage 2A.

An end of the first lateral portion 3 and the end of the scissor lift 2B distal the cage are pivotally connected such that the angle between first lateral portion 3 and the primary upright section 2 can be between 0 and 90 degrees.

The remaining structure, connectivity, function and operation of the second embodiment is substantially the same as described in relation to the first embodiment.

A third embodiment of the present invention is shown in FIGS. 17-20. The third embodiment includes substantially the same features of the second embodiment. The only difference between the third embodiment and the second embodiment is that the boom apparatus 1 is of different dimensions in each embodiment. In particular, the length of the secondary upright section 5, 6 is shorter in the third embodiment.

Figure 18:
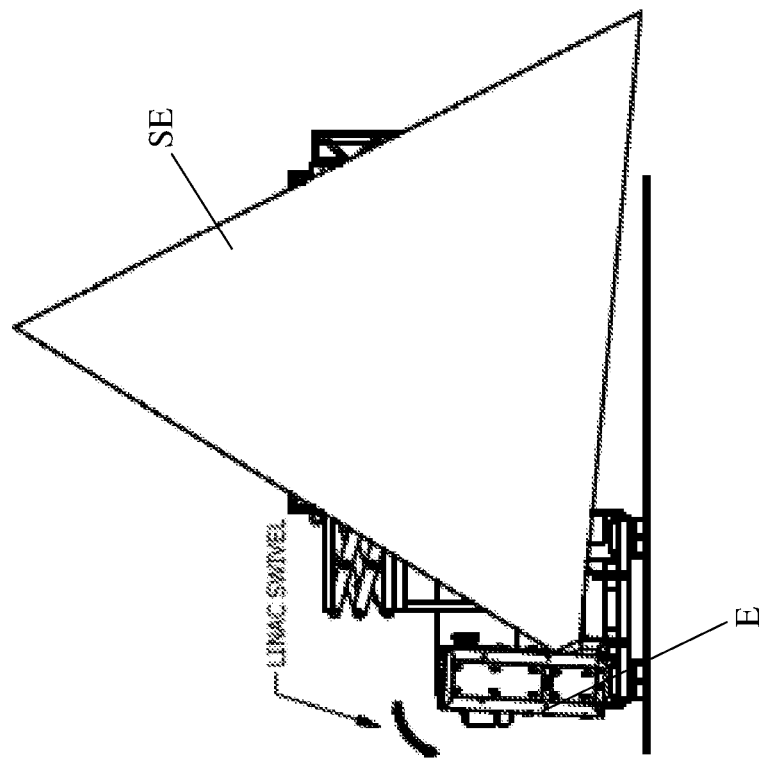
FIG. 18 shows a rear view of the article scanning system of FIG. 17, wherein the boom apparatus is arranged in the deployed configuration.
Figure 17:
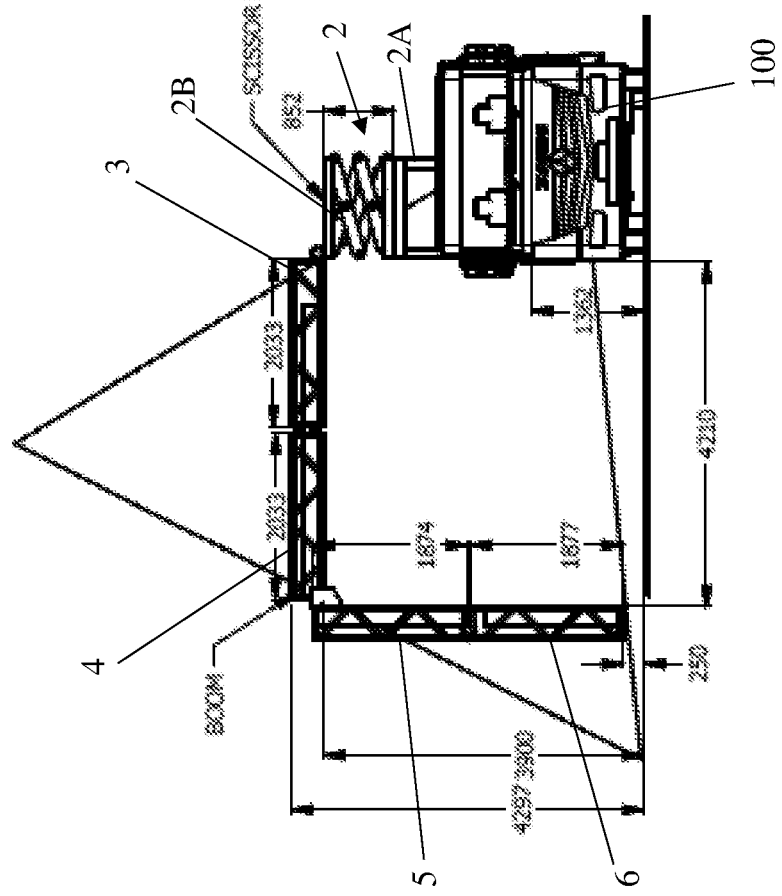
FIG. 17 shows a front view of an article scanning system of a third embodiment of the present invention, wherein the boom apparatus is arranged in the deployed configuration.
Figure 20:
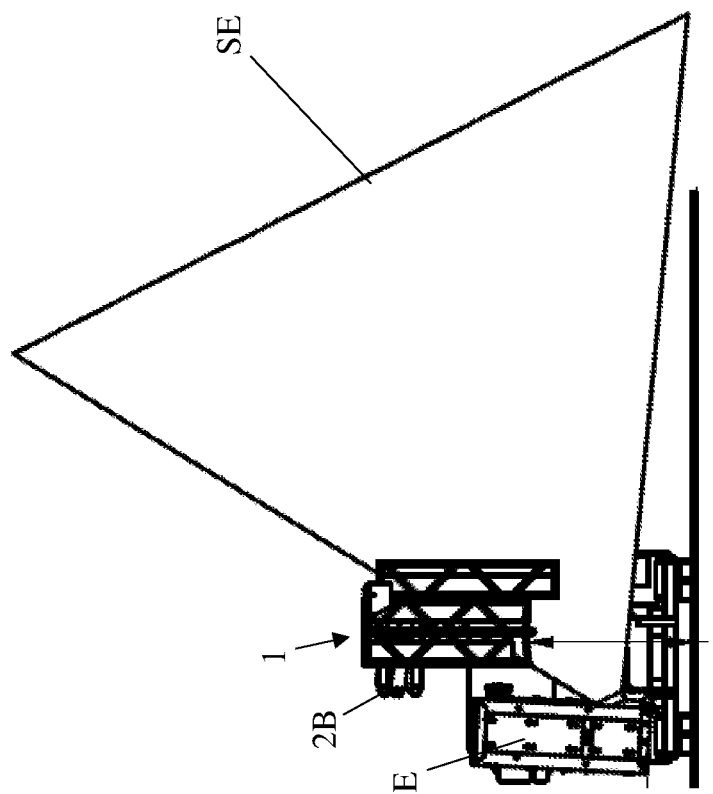
FIG. 20 shows a rear view of the article scanning system of FIG. 17, wherein the boom apparatus is arranged in the stowed configuration.
Figure 19:
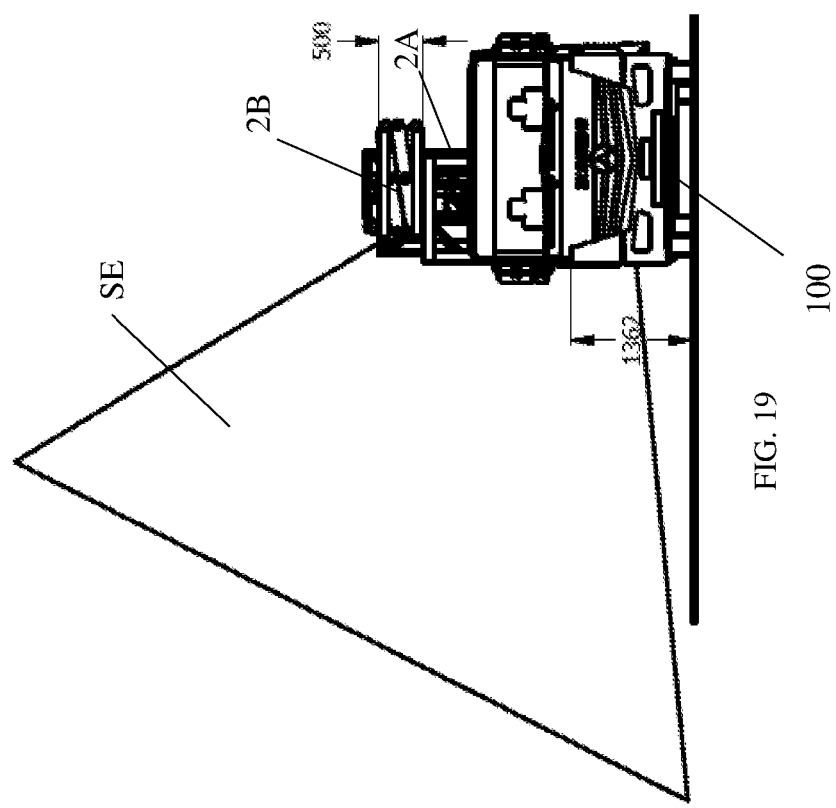
FIG. 19 shows a front view of the article scanning system of FIG. 17, wherein the boom apparatus is arranged in the stowed configuration.

As shown in FIGS. 17 and 18, in the deployed configuration, the scissor lift 2B may be in an extended arrangement. Those skilled in the art will appreciate that the scissor lift 2B may be adjusted in height as desired or required. For example, in the deployed configuration, the scissor lift 2B may be arranged at various degrees of extension. The stowed configuration of the boom apparatus 1 is shown in FIGS. 19 and 20.

Figure 21:
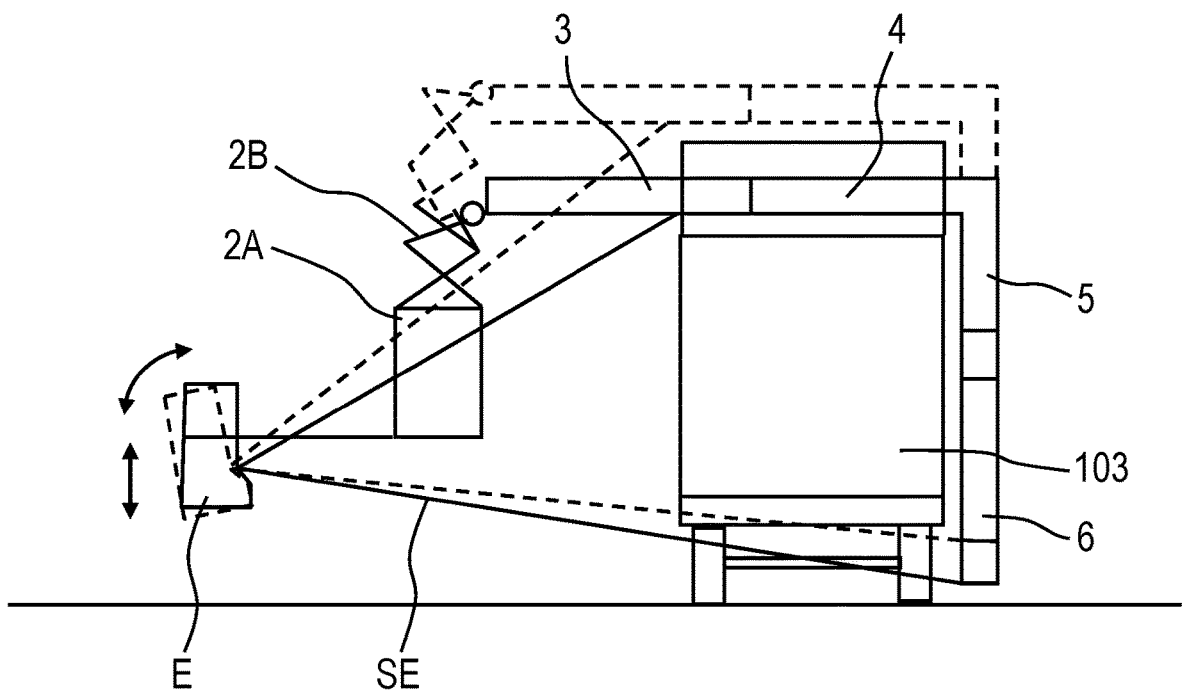
FIG. 21 shows a schematic of the article scanning system of FIG. 11-16 or 17-20, wherein the boom apparatus is arranged in the deployed configuration at a first height (solid lines) or a second height (phantom lines)

FIG. 21 shows the boom apparatus 1 of the second or third embodiment arranged at a first height (see solid lines) or at a second height (see phantom lines). The second height is greater than the first height.

The x-ray emitter module E is pivotally mounted on the rear end of the truck 100, such that the emitter module E is pivotable about a horizontal axis substantially in the plane P of the boom apparatus 1 when arranged in the deployed configuration. Furthermore, the x-ray emitter module E is slidably mounted in the upright (vertical) direction on the rear end 103 of the loading platform 102. By pivoting and/or sliding the emitter module E, the scanning envelope SE may be adjusted for optimal scanning of an article of a given size (e.g. when the boom apparatus is adjusted to the first height or the second height). This facilitates optimal alignment between the emitter module E and the detector module E, so that the scanning envelope SE optimally coincides with the detector module D, at different heights of the boom apparatus 1 in the deployed configuration.

The emitter module E is pivotally connected to a slide which is vertically slidable relative to, and constrained within, a guide, and the guide is fixed to the rear end of the truck 100. Other arrangements may be used, as will be recognised by those skilled in the art.

A fourth embodiment of the present invention is shown in FIGS. 24-31. The fourth embodiment includes substantially the same features of the first embodiment. The main differences between the fourth embodiment and the first embodiment are the structure of the primary upright section 2 and the connection between the first upright portion 5 and second upright portion 6. Thus, only these differences are described in detail below.

Figure 24:
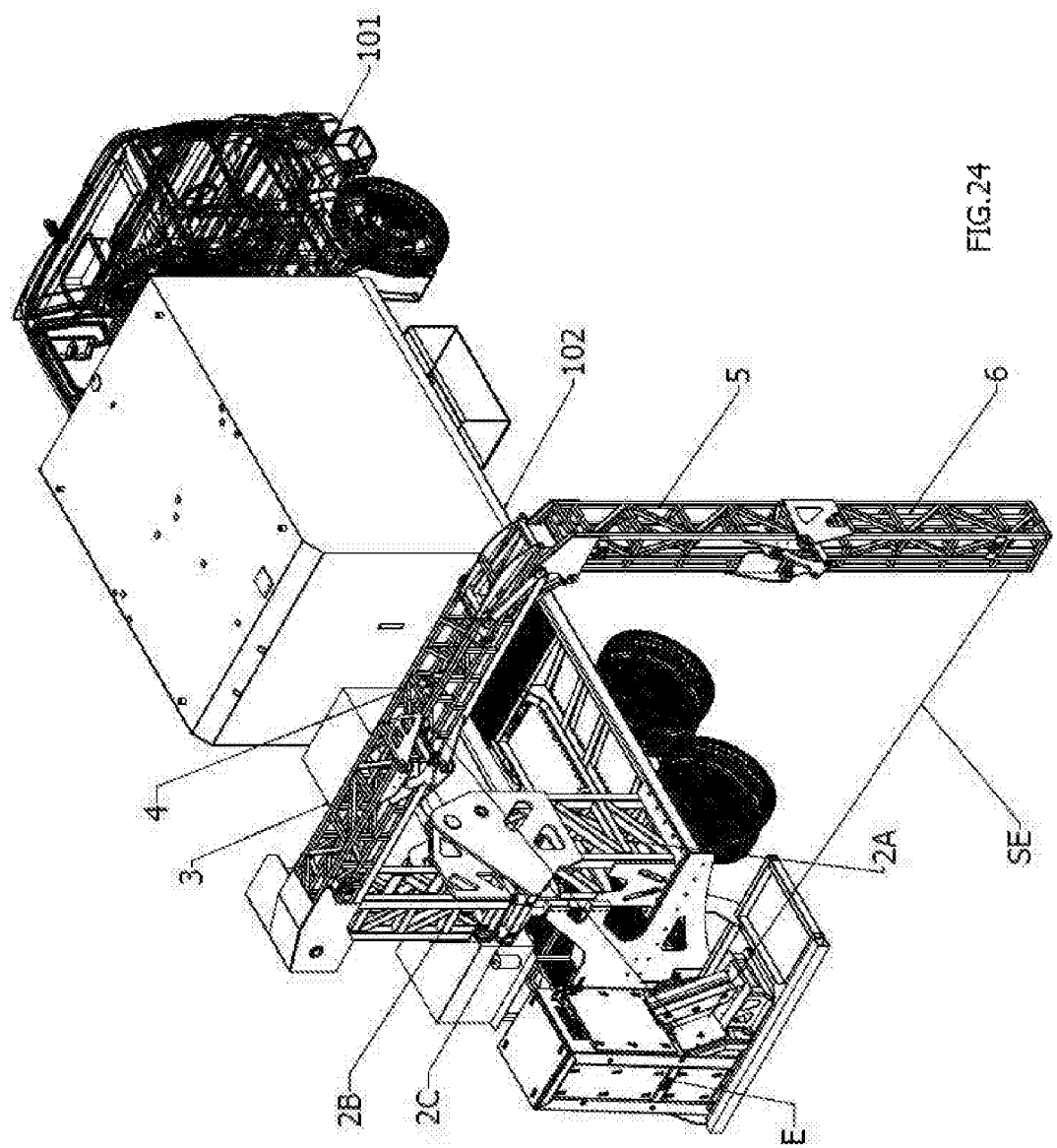
FIG. 24 shows a perspective view of an article scanning system according to a fourth embodiment of the present invention, wherein the boom apparatus is arranged in a deployed configuration.
Figure 25:
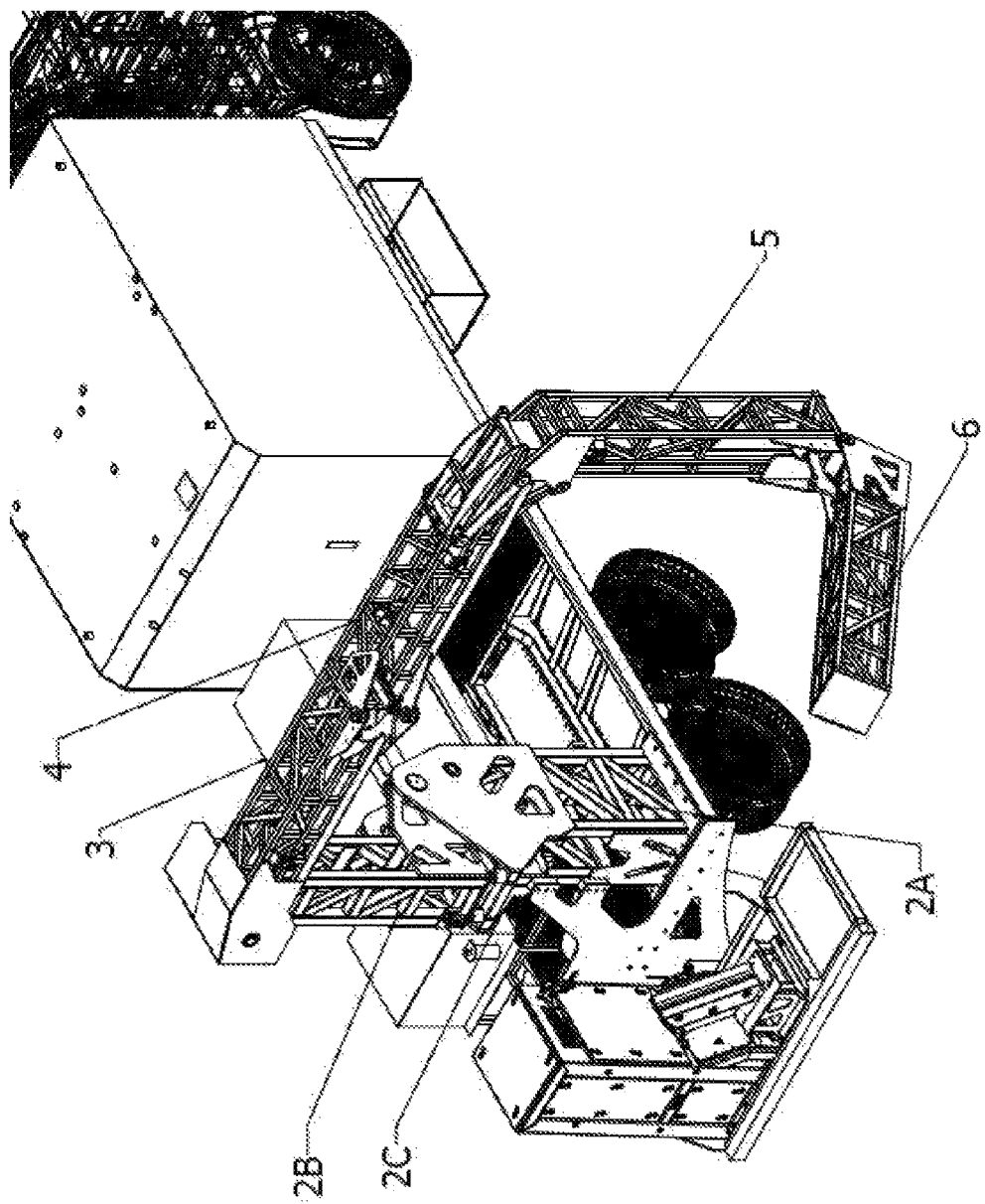
FIG. 25 shows the article scanning system of FIG. 24, wherein the boom apparatus is at a stage of moving from the deployed configuration to the stowed configuration.
Figure 26:
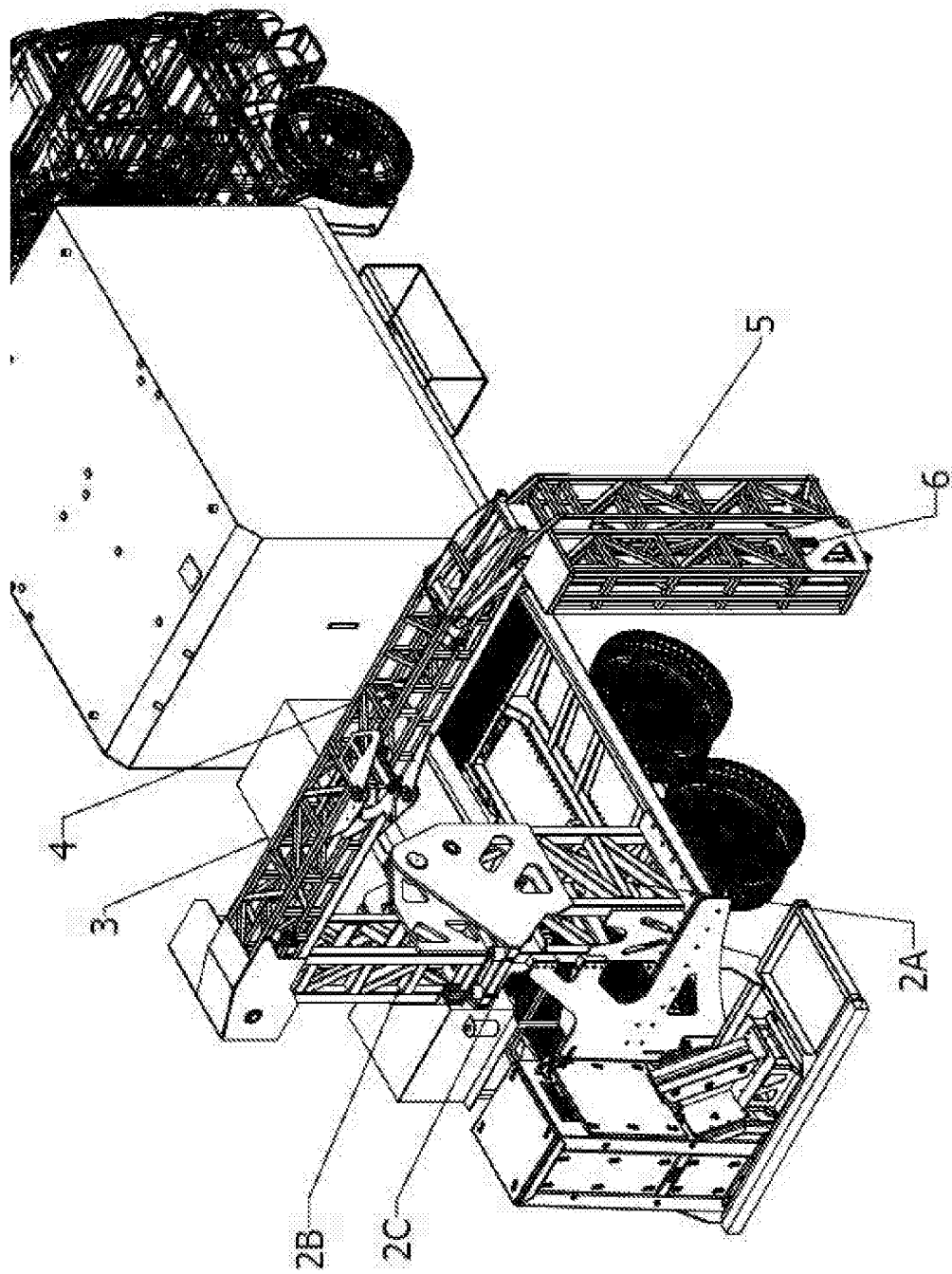
FIG. 26 shows the article scanning system of FIG. 24, wherein the boom apparatus is at another stage of moving from the deployed configuration to the stowed configuration.
Figure 27:
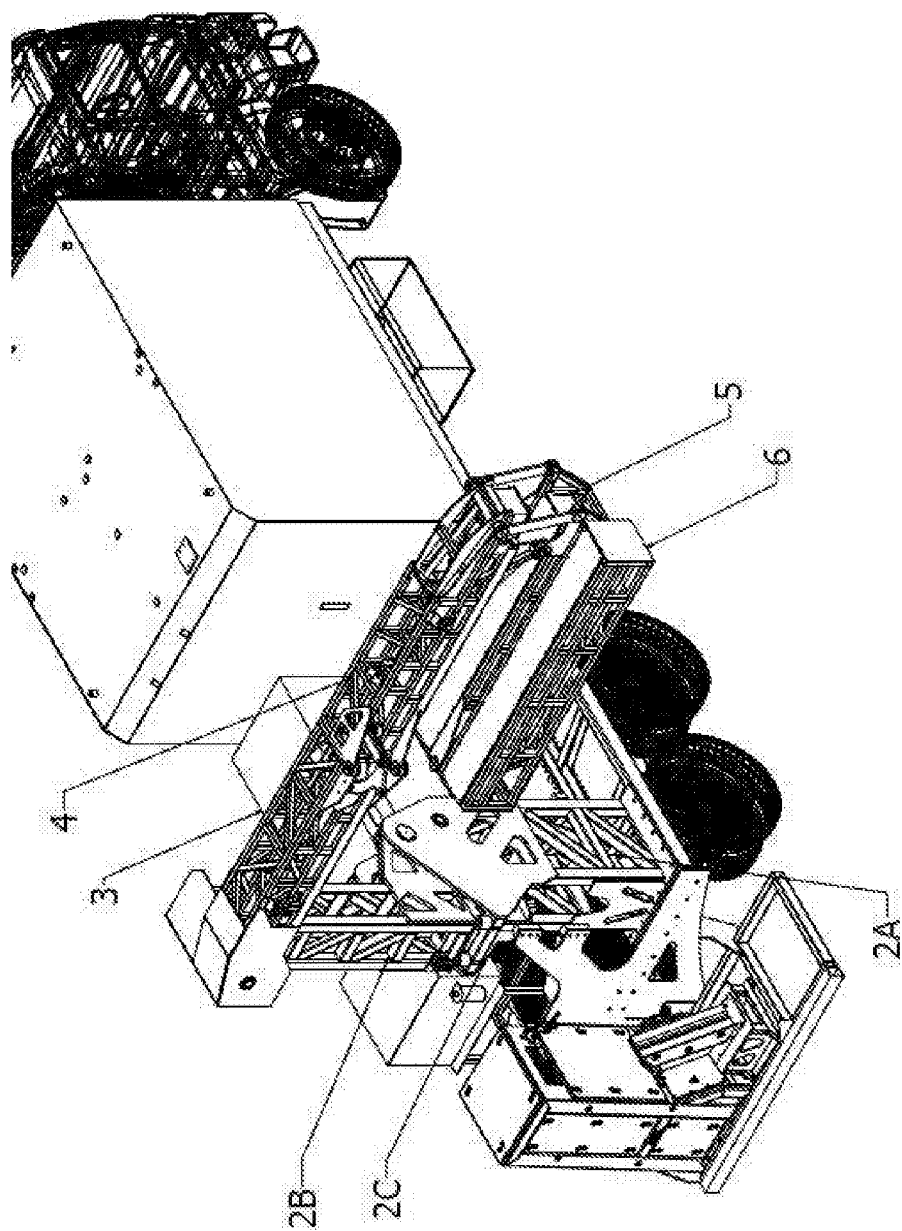
FIG. 27 shows the article scanning system of FIG. 24, wherein the boom apparatus is at another stage of moving from the deployed configuration to the stowed configuration.
Figure 28:
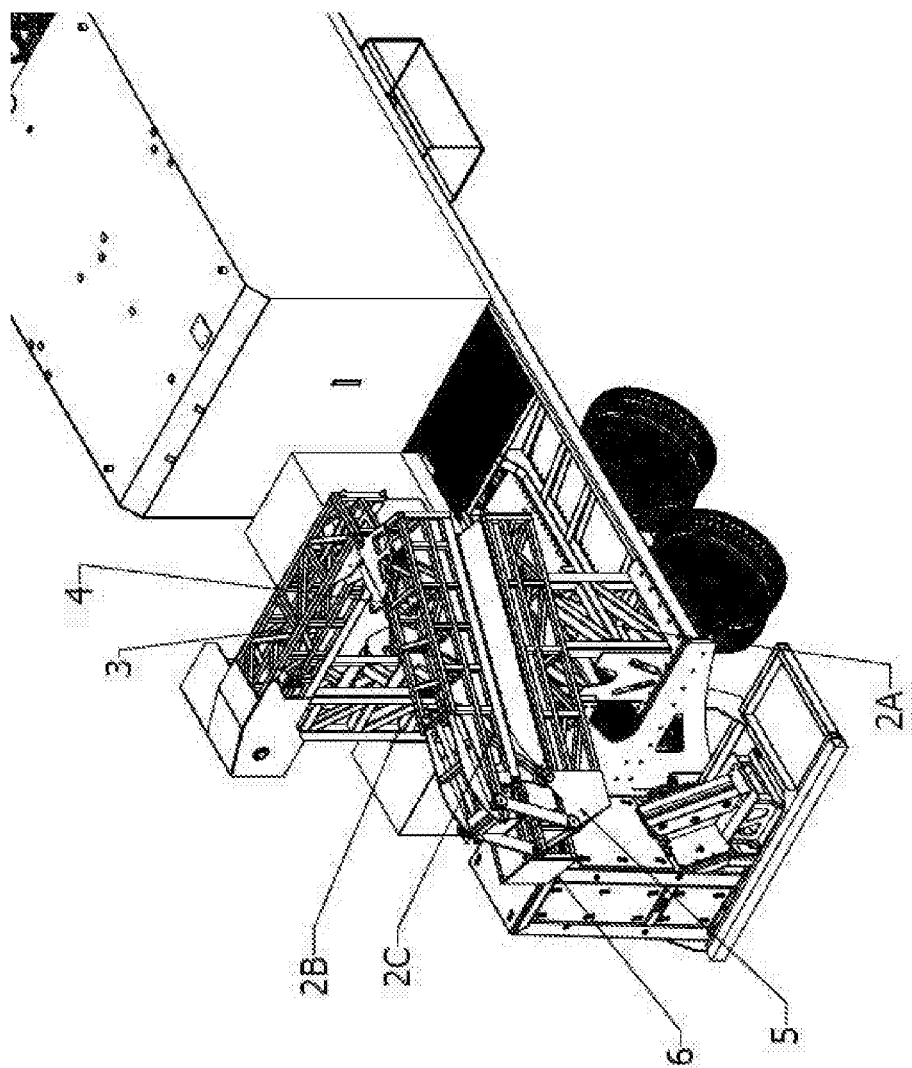
FIG. 28 shows the article scanning system of FIG. 24, wherein the boom apparatus is at another stage of moving from the deployed configuration to the stowed configuration.
Figure 29:
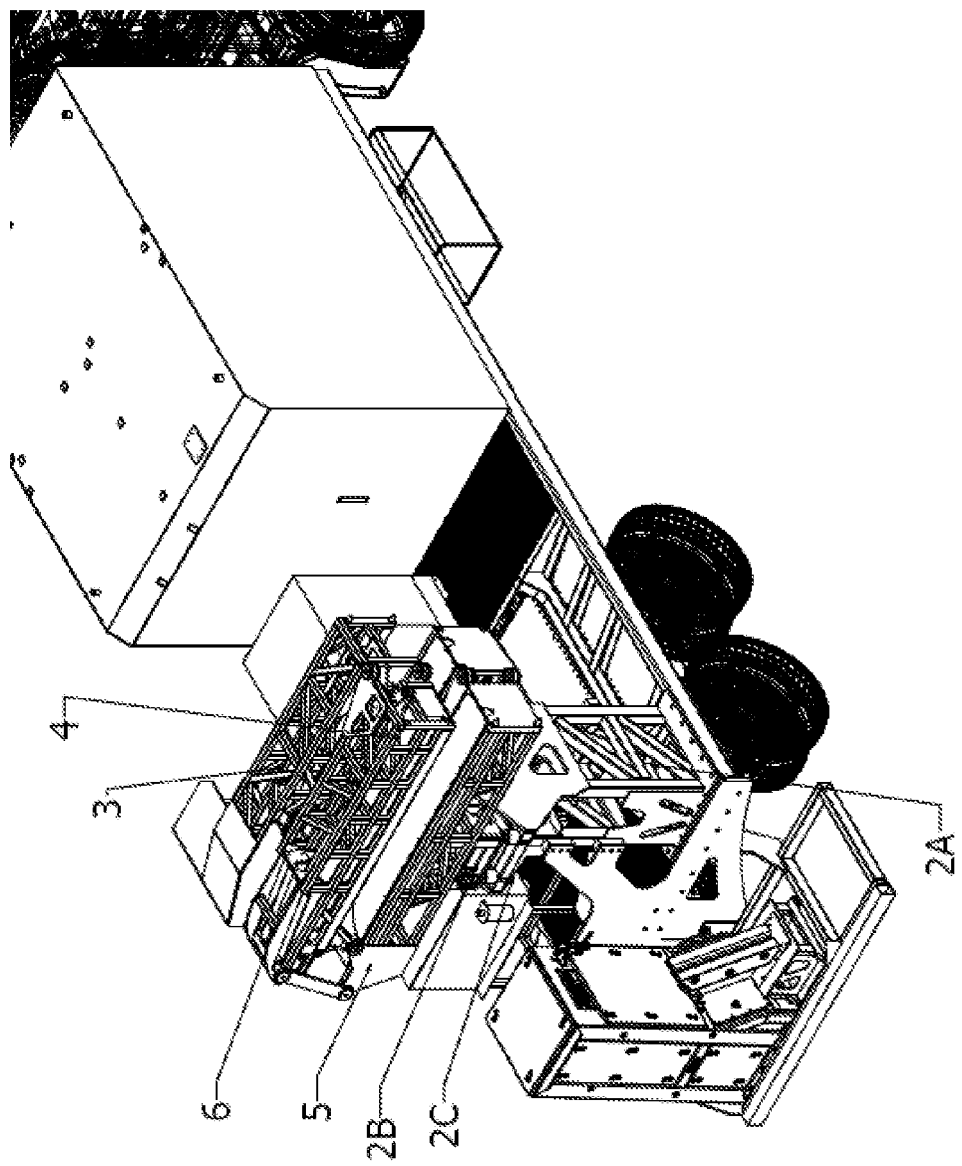
FIG. 29 shows the article scanning system of FIG. 24, wherein the boom apparatus is at another stage of moving from the deployed configuration to the stowed configuration.

Referring to FIGS. 24-26, the first upright portion 5 is pivotally connected at one end to the second lateral portion 4 and at its other end to the second upright portion 6 as described in the relation to the first embodiment.

As in the first embodiment, in the deployed configuration the first upright portion 5 and the second upright portion 6 are arranged axially (i.e. linearly), with the angle between the longitudinal axis of the first upright portion 5 and the longitudinal axis of the second upright portion 6 being around 180 degrees. Furthermore, in the stowed configuration, the first upright portion 5 and the second upright portion 6 are arranged side-by-side and with their longitudinal axes in parallel, and the angle between the longitudinal axis of the first upright portion 5 and the longitudinal axis of the second upright portion 6 is around 0 degrees.

In the fourth embodiment, the first upright portion 5 and second upright portion 6 are arranged such that the second upright portion 6 may pivot out of the plane P of the boom apparatus 1 with respect to the first upright portion 5. This contrasts with the first embodiment wherein the second upright portion 6 may pivot outwardly in the plane P of the boom apparatus 1.

Figure 30:
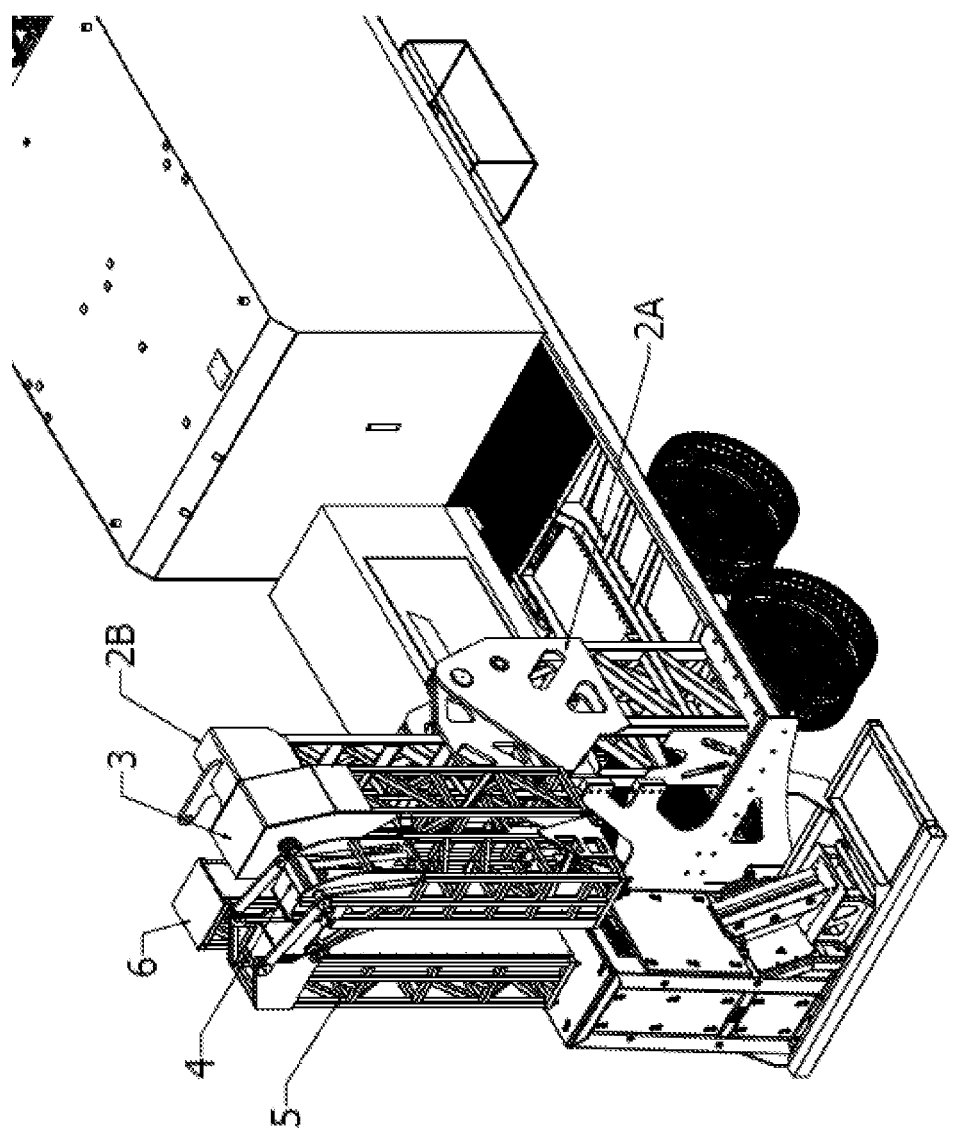
FIG. 30 shows the article scanning system of FIG. 24, wherein the boom apparatus is at another stage of moving from the deployed configuration to the stowed configuration.
Figure 31:
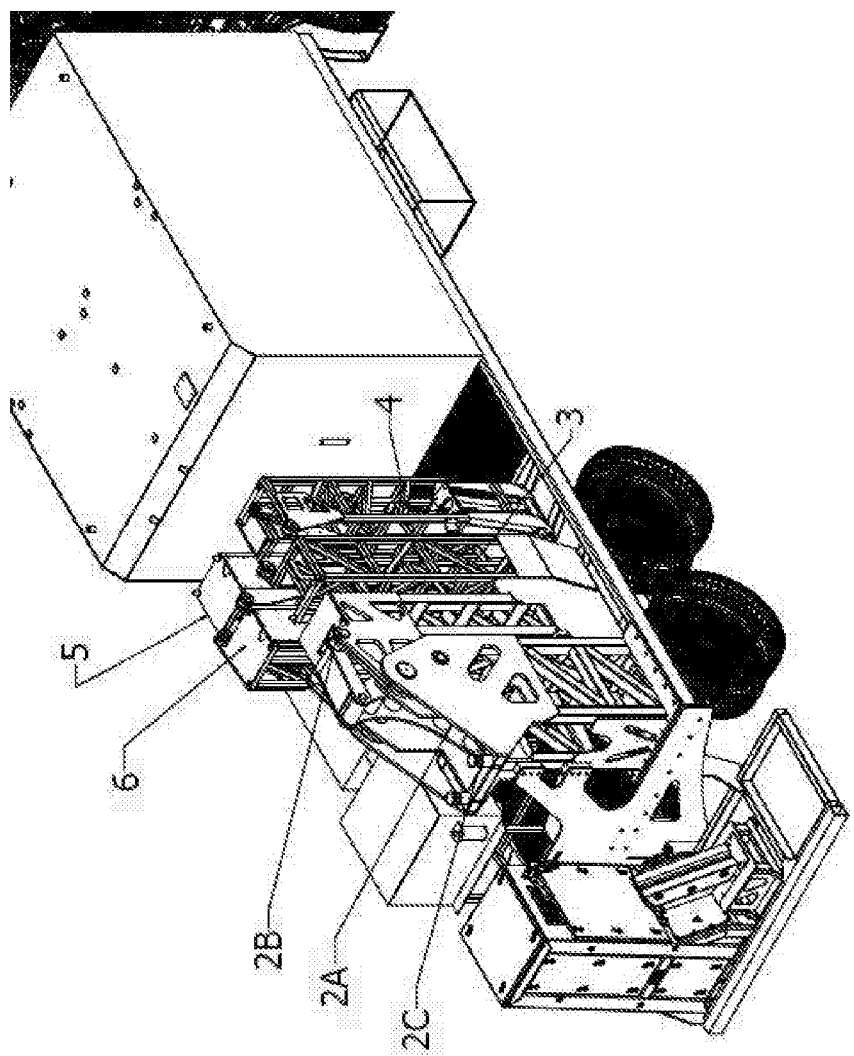
FIG. 31 shows the article scanning system of FIG. 24, wherein the boom apparatus is in the stowed configuration.

Referring to FIGS. 30-31, the primary upright section 2 comprises two upright lift parts: a first lift part 2A pivotally connected to a second lift part 2B by a connector in the form of a hinge 2C. The first lift part 2A and second light part 2B are elongate, substantially rectangular and formed of a lattice structure having a plurality of metal beams joined at nodes to define an internal lattice area. The first upright part 2A and hinge 2C have a combined length that is substantially equal to the length of the second upright part 2B.

As described in relation to the first embodiment, the first lift part 2A is fastened to the rear end 103 of the loading platform 102 using bolts, distal the cab 101.

The end of the second lift part 2B not connected to the hinge 2C is connected to the first lateral portion 3 as described in relation to the first embodiment.

In this embodiment, the loading platform 102 also comprises a structure 104 between the boom apparatus 1 and cab 101. The structure 104 may comprise apparatus for operating the boom apparatus 1, an operator's cabin, or the like.

The hinge 2C is configured to allow the second lift part 2B to pivot with respect to the first lift part 2A such that the angle between the first lift part 2A and the second lift part 2B can be between 0 and 180 degrees.

In the deployed configuration, the first lift part 2A and second lift part 2B are arranged axially with an angle between the first lift part 2A and second lift part 2B of around 180 degrees. Due to the necessity for the primary upright portion 2 to support the entire weight of the rest of the boom apparatus 1, the hinge 2C is configured to stack the second lift part 2B directly on top of the first lift part 2A in a ball and socket arrangement. This minimises the weight that must be supported through the hinge joint directly reducing the likelihood of structural failure of the hinge 2C.

In the stowed configuration, the first lift part 2A and second lift part 2B are arranged side by side with their longitudinal axes parallel and an angle between the first lift part 2A and second lift part 2B of around 0 degrees.

Referring to FIGS. 24-26, in this embodiment, the second upright portion 6 moves from the deployed configuration to the stowed configuration by pivoting out of plane P towards a rear of the vehicle 100 until it is arranged side-by-side with the first upright portion 5. This contrasts with the first embodiment, where the second upright portion 6 pivots outwardly but in the plane P of the boom apparatus 1.

Referring to FIGS. 26-30, the stowing of the first upright portion 5, first lateral portion 3 and second lateral portion 4 is very similar to that of the first embodiment. The main difference being that during pivoting of the second lateral portion 4 relative to the first lateral portion 3, the second upright portion 6 is positioned laterally adjacent to the first upright portion 5. In contrast, during the same movement the second upright portion 6 of the first embodiment is adjacent but beneath the first upright portion 5. In the first embodiment, this results in a stowed configuration in which the first lateral portion 3, the second lateral portion 4, first upright portion 5, and second upright portion 6 are arranged upright and side-by-side in two rows aligned perpendicular to the longitudinal axis of the vehicle 100: the first row comprising just the first lateral portion 3; and the second row comprising the second lateral portion 4, first upright portion 5, and second upright portion 6. In contrast, in the fourth embodiment, the first lateral portion 3, the second lateral portion 4, first upright portion 5, and second upright portion 6 are arranged in a 2x2 formation comprising two rows: the first comprising the second lateral portion 4 and first upright portion 5; and the second comprising the first lateral portion 3 and second upright portion 6. In this embodiment, all the lateral portions 3, 4 and upright portions 5, 6 have a square/rectangular cross-section, and as such, the 2x2 formation in the stowed configuration has a combined cross-section that is square/rectangular making stowing the boom apparatus 1 onto the back of the truck 100 more convenient and efficient.

Referring to FIGS. 30-31, prior to pivoting of the second lift part 2B, the first lateral portion 3, the second lateral portion 4, first upright portion 5, and second upright portion 6 are arranged upright and side-by-side in two rows. The two rows being suspended off the rear end of the vehicle 100, but located completely within the width of the vehicle 100.

The second lift part 2B then pivots in a plane perpendicular to the plane P and towards the cab 101 through approximately 180 degrees until the second lift part 2B is substantially upright and in a side-by-side arrangement with the first life part 2A. In this stowed position, all parts/portions of the boom apparatus 1 are arranged side-by-side and upright. From the rear of the vehicle 100 towards the cab 1 the boom apparatus 1 in the stowed configuration comprises four rows: the first lift part 2a; the second lift part 2B; the first lateral portion 3 laterally adjacent to the second upright portion 6; and the second lateral portion 4 laterally adjacent to the first upright portion 5. Thus, in the stowed configuration the boom apparatus 1 is entirely contained within the vehicle 100 and is compact to ensure most efficient use of the space available.

In this embodiment, the lateral portions 3, 4 and upright portions 5, 6 have substantially equal length, and have a length substantially equal to the second lift part 2B. Thus, when in the stowed configuration, the lateral portions 3, 4, upright portions 5, 6, first lift part 2A/hinge and second lift part 2B form a compact cuboidal structure.

Figure 32:
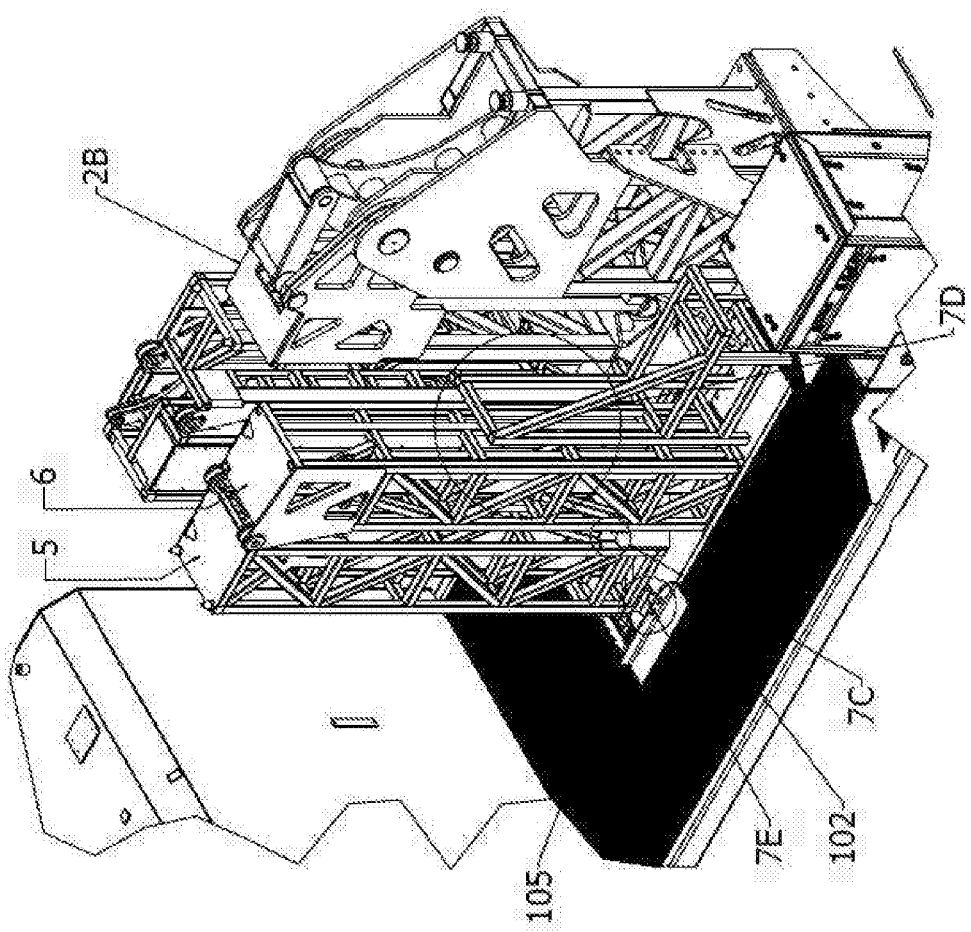
FIG. 32 shows a cut-away view the article scanning system of FIG. 24, wherein the boom apparatus is in the stowed configuration.

Referring to FIGS. 32 and 33, in this embodiment, the truck bed 102 further comprises an engagement area 105 configured to receive the lower ends of the first upright portion 5 and second lateral portion 4 when in the stowed configuration. In this embodiment the engagement area 105 is recessed with respect to the surface of the truck bed 102 and in some embodiments the engagement area 105 may comprise an aperture in the truck bed 102. Thus the engagement area 105 allows the ends of the first upright portion 5 and second lateral portion 4 to project past the surface of the truck bed 102 ensuring the boom apparatus 100 is stowed most efficiently. The engagement area 105 can also provide support to the boom apparatus 100 to ensure that lateral and vertical loads through the connector (hinge 7C) are minimised.

In some embodiments the boom apparatus 100 additionally comprises one or more support stops to provide structural support to the boom apparatus 100 when in the stowed configuration and prevent damage to the connector (hinge 7C). This embodiment comprises five stops 7A-7E:

a lift part stop 7A provided between the first lift part 2A and second lift part 2B at a position at least half the length of the first/second lift part 2A/2B from the hinge 2C when in the stowed configuration;
a lateral portion stop 7B provided between the first lateral portion 3 and second lateral portion 4 at a position at least half the length of the first/second lateral portion 3/4 from the connection between them when in the stowed configuration;
an upright portion stop 7C provided between the first upright portion 5 and second upright portion 6 at a position at least half the length of the first/second upright portion 5/6 from the connection between them when in the stowed configuration;
a horizontal stop 7D comprising a post extending vertically from the truck bed 102 adjacent the second upright portion 6 and on the truck's rearward side of the second upright portion 6 when in the stowed configuration, the horizontal stop 7D being at least half the length of the second upright portion 6; and
a vertical stop 7E provided between the first upright portion 5 and the engagement area 105.

All stops 7A-7E act to bear lateral forces experienced by the boom apparatus 100 when in the stowed configuration, such as acceleration or deceleration of the truck 100 while in motion. This reduces the lateral forces that the hinge 7C must bear as well as lateral forces on the connections between the different components of the boom apparatus 100.

The vertical stop 7E additionally bears the weight of the boom apparatus 100 this reduces the vertical load that is experienced by the hinge 2C when the boom apparatus is in the stowed configuration. In this embodiment the vertical stop 7E is positioned between the first upright portion 5 and engagement area 105, but in other embodiments it may be provided at any suitable position to support the weight of the boom apparatus 100. For example, where the truck bed 102 does not comprise an engagement area 105 the vertical stop 7E could be between the second lateral portion 4 and the truck bed 102.

The one or more embodiments are described above by way of example only. Many variations are possible without departing from the scope of protection afforded by the appended claims.

The invention claimed is:

1. A boom apparatus for use in an article scanning system, the boom apparatus comprising:
 a primary upright section mountable on a vehicle of the article scanning system;
 a lateral section comprising two or more movably connected lateral portions;
 a secondary upright section comprising two or more movably connected upright portions; and
 a radiation detector module arranged to detect radiation emitted by a radiation emitter module;
 wherein each of the lateral section and the secondary upright section is movable between an extended arrangement and a collapsed arrangement, and
 wherein the boom apparatus is configurable in:
  a deployed configuration in which each of the lateral section and the secondary upright section is in the extended arrangement, and the primary upright section, the lateral section, and the secondary upright section define a structure through which an article to be scanned can pass, and
  a stowed configuration in which each of the primary upright section, the lateral section, and the secondary upright section is in the collapsed arrangement, and further each of the primary upright section, the lateral section, and the secondary upright section is substantially upright.

2. The boom apparatus as claimed in claim 1, wherein the primary upright section comprises two or more movably connected upright lift parts, and the primary upright section is movable between an extended arrangement and a collapsed arrangement.

3. The boom apparatus as claimed in claim 2, wherein at least one of the two or more movably connected upright lift portions is configured to rotate with respect to another of the two or more movably connected upright lift portions out a plane of the boom apparatus, wherein the plane is defined by the structure through which the article to be scanned can pass of the boom apparatus in the deployed configuration.

4. The boom apparatus as claimed in claim 2, wherein the primary upright section further comprises a connector, a first lift part, and a second lift part, wherein the connector is configured to permit a rotation of the second lift part with respect to the first lift part.

5. The boom apparatus as claimed in claim 4, wherein in the deployed configuration, an angle between the first lift part and the second lift part is around 180 degrees, and in the stowed configuration, the angle between the first lift part and the second lift part is around zero degrees.

6. The boom apparatus as claimed in claim 4, wherein one of the first lift part or the second lift part and the connector have a combined length substantially equal to a length of the other of the first lift part or the second lift part.

7. The boom apparatus as claimed in claim 6, wherein each of the two or more movably connected lateral portions and each of the two or more movably connected upright portions has a length substantially equal to the length of the other of the first lift part or the second lift part.

8. The boom apparatus as claimed in claim 1, wherein a length of each of the two or more movably connected lateral portions and each of the two or more movably connected upright portions is substantially equal.

9. The boom apparatus as claimed in claim 1, wherein when moving from the deployed configuration to the stowed configuration, at least one of the two or more movably connected lateral portions or the two or more movably connected upright portions is configured to pivot out of a plane of the boom apparatus.

10. The boom apparatus as claimed in claim 1, wherein at least one of the lateral section or the secondary upright section comprises a lattice structure.

11. An article scanning system comprising:
a boom apparatus as claimed in claim 1; and
a vehicle on which the primary upright section is mounted.

12. The article scanning system as claimed in claim 11, wherein the vehicle comprises a loading platform, and the primary upright section is mounted on the loading platform of the vehicle.

13. The article scanning system as claimed in claim 11, further comprising the radiation emitter module, wherein the vehicle comprises a loading platform, and the radiation emitter module is arranged adjacent to the primary upright section.

14. The article scanning system as claimed in claim 11, further comprising the radiation emitter module.

15. The article scanning system as claimed in claim 14, wherein the radiation emitter module is pivotally mounted on the vehicle, such that the radiation emitter module is pivotable about a lateral axis.

16. The article scanning system as claimed in claim 14, wherein the radiation emitter module is slidably mounted on the vehicle so as to be slidable in an upright direction.

17. A method of stowing a boom apparatus as claimed in claim 1, the method comprising steps of:
providing the boom apparatus in the deployed configuration; and
moving the boom apparatus from the deployed configuration to the stowed configuration.

18. The method as claimed in claim 17, wherein the moving step comprises:
arranging the two or more movably connected upright portions in the collapsed arrangement; and
arranging the two or more movably connected lateral portions in the collapsed arrangement.

19. The method of deploying a boom apparatus as claimed in claim 1, the method comprising the steps of:
providing the boom apparatus in the stowed configuration; and
moving the boom apparatus from the stowed configuration to the deployed configuration.

20. The method as claimed in claim 19, wherein the moving step comprises:
arranging the two or more movably connected upright portions in the extended arrangement; and
arranging the two or more movably connected lateral portions in the extended arrangement.

* * * * *